(12) United States Patent
Clerckx et al.

(10) Patent No.: US 8,594,683 B2
(45) Date of Patent: Nov. 26, 2013

(54) METHOD AND APPARATUS FOR ADAPTIVE SCHEDULING BASED ON COORDINATED RANK IN MULTI-CELL COMMUNICATION SYSTEM

(75) Inventors: Bruno Clerckx, Seoul (KR); Heun Chul Lee, Hwaseong-si (KR); Young Jun Hong, Seoul (KR); Ki Il Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 13/217,978

(22) Filed: Aug. 25, 2011

(65) Prior Publication Data

US 2012/0052895 A1 Mar. 1, 2012

Related U.S. Application Data

(60) Provisional application No. 61/377,265, filed on Aug. 26, 2010.

(30) Foreign Application Priority Data

Jan. 31, 2011 (KR) .................. 10-2011-0009653

(51) Int. Cl.
*H04W 40/00* (2009.01)

(52) U.S. Cl.
USPC .................. 455/449; 455/436; 455/448

(58) Field of Classification Search
USPC .............. 455/426.1, 436–444, 448, 449
See application file for complete search history.

(56) References Cited

U.S. PATENT DOCUMENTS

| 5,432,931 | A  | * | 7/1995 | Woess et al. ................. 1/1 |
| 6,842,104 | B1 | * | 1/2005 | Osaka et al. ............... 340/2.28 |
| 6,845,281 | B1 | * | 1/2005 | Griech ...................... 700/122 |
| 7,457,891 | B2 | * | 11/2008 | Torisaki et al. .............. 710/22 |
| 7,944,900 | B2 | * | 5/2011 | Yamagiwa ................... 370/338 |
| 2009/0161602 | A1 | * | 6/2009 | Matsumoto ................ 370/328 |
| 2010/0250962 | A1 | * | 9/2010 | Chan et al. ................. 713/189 |
| 2011/0255625 | A1 | * | 10/2011 | Song et al. ................. 375/267 |

FOREIGN PATENT DOCUMENTS

| KR | 10-2010-0074803 A | 7/2010 |
| KR | 10-2010-0088511 A | 8/2010 |
| WO | 2010/064856 A3 | 6/2010 |

* cited by examiner

*Primary Examiner* — Dominic E Rego

(74) *Attorney, Agent, or Firm* — Jefferson IP Law, LLP

(57) ABSTRACT

An adaptive scheduling method and apparatus that adaptively perform scheduling based on a coordinated rank in a multi-cell communication system are provided. A master base station may schedule, with a first priority, master terminals, each of which has a preferred rank equal to a transmission rank of the master base station, and may transmit, to a slave base station, information associated with a group of scheduled master terminals. The slave base station may schedule, with different priorities, slave terminals based on whether a transmission rank of the slave base station is equal to the coordinated rank for the master base station.

15 Claims, 7 Drawing Sheets

METHOD AND APPARATUS FOR ADAPTIVE SCHEDULING BASED ON COORDINATED RANK IN MULTI-CELL COMMUNICATION SYSTEM

PRIORITY

This application claims the benefit under 35 U.S.C. §119(e) of a U.S. Provisional application filed on Aug. 26, 2010, in the U.S. Patent and Trademark Office and assigned Ser. No. 61/377,265, and the benefit under 35 U.S.C. §119(a) of a Korean patent application filed on Jan. 31, 2011, in the Korean Intellectual Property Office and assigned Serial No. 10-2011-0009653, the entire disclosure of each of which is hereby incorporated by reference.

BACKGROUND OF THE INVENTION

1. Field of the Invention

The present invention relates to an adaptive scheduling method and apparatus. More particularly, the present invention relates to an adaptive scheduling method and apparatus that may perform adaptive scheduling based on a coordinated rank in a multi-cell communication system.

2. Description of Related Art

A terminal may measure a channel from a base station in a multi-cell communication system. The terminal may feed back, to the base station, information associated with the measured channel. The base station may perform precoding based on the information fed back from the terminal. However, when inter-cell coordination is not performed, a terminal existing on an edge of a cell may receive interference from a base station included in a neighbor cell.

SUMMARY OF THE INVENTION

Aspects of the present invention are to address at least the above-mentioned problems and/or disadvantages and to provide at least the advantages described below. Accordingly, an aspect of the present invention is to provide an apparatus and method for performing adaptive scheduling.

In accordance with an aspect of the present invention, a communication method of a master base station in a cluster including the master base station and at least one slave base station is provided. The method includes receiving, from at least one master terminal, corresponding to the master base station, information associated with a preferred rank, determining a transmission rank, based on information that is associated with a coordinated rank with respect to the master base station and on information that is received from at least one slave terminal corresponding to the at least one slave base station, scheduling, when a master terminal exists in a first master group, the master terminal included in the first master group, and scheduling, when a terminal included in the first master group is nonexistent, a master terminal included in a second master group, the first master group being defined as a set of master terminals, each of which has a preferred rank equal to the transmission rank and the second master group being defined as a set of master terminals, each of which has a preferred rank unequal to the transmission rank, and transmitting, to the at least one slave base station, information associated with the group in which the scheduled master terminal is included and information associated with the transmission rank.

The determining may include receiving, from the at least one slave base station, the information associated with the coordinated rank with respect to the master base station.

The scheduling may include performing scheduling based on a Proportional Fair (PF) scheduling in a frequency domain.

In accordance with another aspect of the present invention, a communication method of a slave base station in a cluster, including a master base station and at least one slave terminal is provided. The method includes receiving information associated with a group of master terminals scheduled by the master base station and information associated with a transmission rank of the master base station, and adaptively scheduling the at least one slave terminal based on whether a coordinated rank of the at least one slave terminal, with respect to the master base station, is equal to the transmission rank of the master base station and based on the group of the master terminals, scheduled by the master base station.

When the group of the master terminals scheduled by the master base station is a first master group which is defined as a set of master terminals, each of which has a preferred rank equal to the transmission rank of the master base station, the adaptive scheduling includes scheduling, with a first priority, a slave terminal that performs coordination with the master base station and that has a coordinated rank equal to the transmission rank of the master base station, when the coordinated rank is a recommended rank with respect to the master base station, and scheduling, with a first priority, a slave terminal that performs coordination with the master base station and that has a coordinated rank unequal to the transmission rank of the master base station, when the coordinated rank is a restricted rank with respect to the master base station.

When the group of the master terminals scheduled by the master base station is a first master group which is defined as a set of master terminals, each of which has a preferred rank equal to the transmission rank of the master base station, and the coordinated rank is a recommended rank with respect to the master base station, the adaptive scheduling includes scheduling, a slave terminal that does not perform coordination, when a slave terminal that performs coordination with the master base station, and that has a coordinated rank equal to the transmission rank of the master base station is nonexistent.

When the group of the master terminals scheduled by the master base station is a first master group which is defined as a set of master terminals, each of which has a preferred rank equal to the transmission rank of the master base station, and the coordinated rank is a recommended rank with respect to the master base station, the adaptive scheduling includes scheduling a slave terminal that performs coordination with the master base station, and has a coordinated rank unequal to the transmission rank of the master base station or a slave terminal, that performs coordination with a base station different from the master base station, when a slave terminal that performs coordination with the master base station and that has a coordinated rank equal to the transmission rank of the master base station and a slave terminal that does not perform coordination with the master base station are nonexistent.

When the group of the master terminals scheduled by the master base station is a second master group which is defined as a set of master terminals, each of which has a preferred rank unequal to the transmission rank of the master base station, the adaptive scheduling includes scheduling the at least one slave terminal with the same priority.

In accordance with another aspect of the present invention, a communication method of a target slave base station in a super cluster, that includes a target cluster and at least one neighbor cluster, wherein the target slave base station is included in the target cluster, the target cluster includes a target master base station and at least one target slave base station, and a neighbor cluster includes a neighbor master base station and at least one neighbor slave base station is provided. The method includes receiving information associated with a transmission rank of each of the master base station and the at least one neighbor master base station, and scheduling at least one target slave terminal corresponding to a target slave base station, based on whether a coordinated rank is equal to a transmission rank of a corresponding coordination master base station.

The scheduling may include scheduling, with a first priority, a target slave terminal having a coordinated rank equal to a transmission rank of a corresponding coordination master base station when the coordinated rank is a recommended rank with respect to the corresponding coordination master base station, and scheduling, with a first priority, a target slave terminal having a coordinated rank unequal to a transmission rank of a corresponding master base station when the coordinated rank is a restricted rank with respect to the master base station.

The scheduling may further include, scheduling a target slave terminal that does not perform coordination when a target slave terminal, having a coordinated rank that is a recommended rank with respect to a corresponding coordination master base station and that is equal to a transmission rank of the corresponding coordination master base station, is nonexistent.

The scheduling may still further include, scheduling a target slave terminal that has a coordinated rank unequal to a transmission rank of a corresponding coordination master base station or a target slave terminal that performs coordination with a base station different from the master base station, when a target slave terminal having a coordinated rank that is a recommend rank with respect to a corresponding coordination master base station and that is equal to a transmission rank of the corresponding coordinated master base station, and a target slave that does not performs coordination with the corresponding coordination master base station, are nonexistent.

Exemplary embodiments may include a master base station that may schedule, with a first priority, master terminals, each of which has a preferred rank equal to a transmission rank of the master base station and thus may enhance transmission efficiency of a master cell.

Exemplary embodiments may further include a master base station that may transmit, to slave base stations, information associated with a group of scheduled master terminals, and may determine priorities of slave terminals, when a slave base station performs scheduling. The slave base station may adaptively perform scheduling based on scheduling of the master base station and thus a Coordinated MultiPoint (CoMP) transmission may be effectively performed.

Exemplary embodiments may even further include a slave base station that may schedule, with different priorities, slave terminals based on whether a transmission rank of the slave base station is equal to a coordinated rank for a master base station and thus inter-cell interference may be effectively suppressed.

Other aspects, advantages, and salient features of the invention will become apparent to those skilled in the art from the following detailed description, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
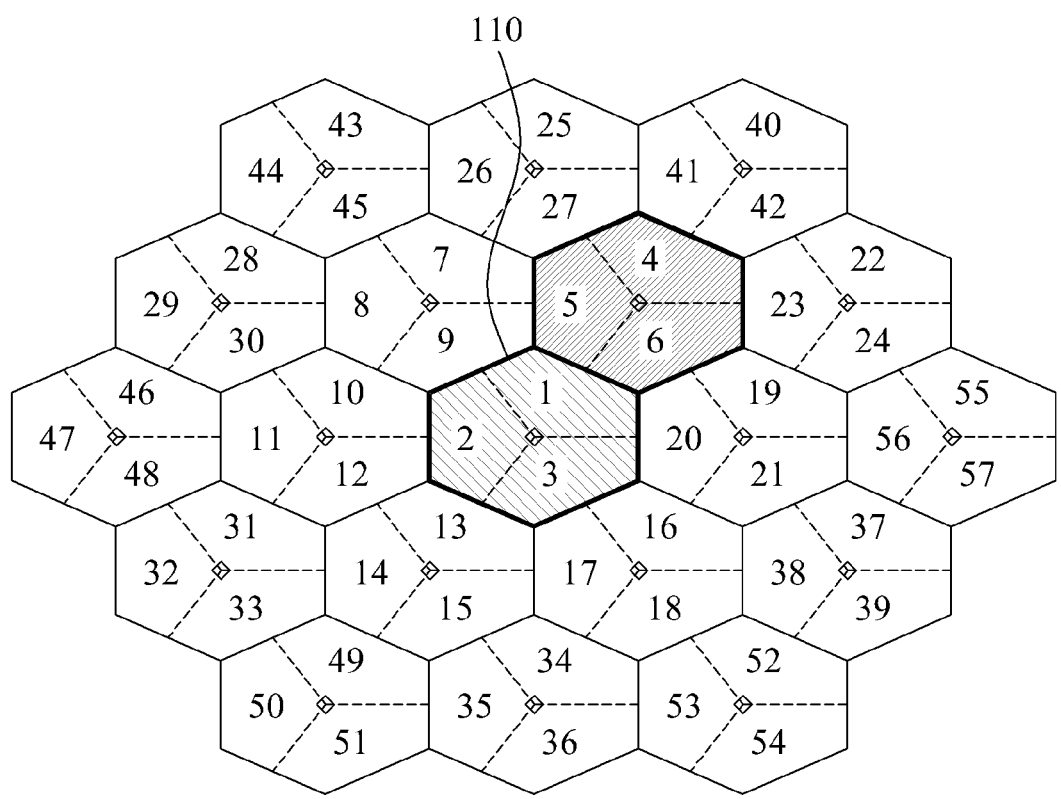
FIG. 1 is a diagram illustrating an intra-site clustering according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal corresponding to a serving base station may transmit, to the serving base station, a preferred Rank Indicator (RI) of the terminal and several Precoding Matrix Indicators (PMIs). The base station may be denoted by an evolved Node B (eNB) in a 3rd Generation Partnership Project Long Term Evolution (3GPP LTE), and the serving base station may be denoted by a serving eNB. In this example, a preferred rank may be a rank that enables a downlink channel throughput from the serving base station to the terminal to be maximized.

The terminal may transmit, to the serving base station, a rank of an interference signal from an interfering base station that minimizes or maximizes performance of the terminal, that is, a coordinated rank (RANK). When the RANK minimizes the performance of the terminal, the terminal may request the interfering base station, that is, an interfering eNB, to restrict the use of the corresponding RANK as a transmission rank. In this example, the corresponding RANK may be referred to as a restricted RANK. When the RANK maximizes the performance of the terminal, the terminal may recommend the interfering base station to use the corresponding RANK as the transmission rank. The terminal may recommend the interfering base station to transmit a number of layers corresponding to the interference RANK. In this example, the RANK may be referred to as a recommended RANK.

The RANK may be determined based on the terminal. The restricted RANK and recommended RANK may be a function of many parameters, for example, a type of a receiver of the terminal, a Channel Quality Information (CQI) computation method, information associated with whether a user specific Reference Signal (DM RS) exists, information of whether DM-RS of an adjacent cell or interfering cell is measured, an RI of a serving base station, a number of antennas of the terminal, and the like.

The base station may exchange, with neighbor base stations, information associated with collected RANKs, based on reports associated with RANKs received from a plurality of terminals, to perform coordination with respect to recommended RANKs or restricted RANKs from all the terminals.

In the transmission, base stations may schedule terminals corresponding to the base stations to enable the base stations to accept requests associated with RANKs of coordinated terminals, that is, CoMP terminals, with the help of a cooperative based scheduler. For example, it is assumed that a first base station, a first terminal, and a second terminal are included in a first cell, a second base station, a third terminal, and a fourth terminal are included in a second cell, and the first terminal reports a recommended RANK for the second base station to the first base station. The cooperative based scheduler may schedule the fourth terminal as opposed to the third terminal, when a recommended RANK of the first terminal, included in the first cell, is equal to an RI of the fourth terminal included in the second cell. Therefore, the first terminal may receive a signal from the first base station which is a service base station, and may receive, from the second base station, interference corresponding to the recommended RANK.

The above described method may reduce a flashlight effect of interference and thus may prevent critical interference situations and may benefit from accurate link adaptation, while generating a small amount of feedback overhead. In addition, a terminal existing on an edge of a cell may also obtain a high transmission rank by the report of the recommended RANK. When an appropriate RANK is selected, the terminal may increase the preferred rank. According to an exemplary embodiment, a degree of freedom of a system may be adjusted based on RANK information and thus receiver interference suppression techniques based on a multi-reception antenna may have a maximized effect. In addition, according to a wideband property of a rank, the report of the RANK may be less sensitive to a feedback, a backhaul delay, and a channel estimation error.

Exemplary embodiments may provide roughly four technologies based on rank recommendation and rank restriction as follows:

First, a CQI computation method based on rank recommendation and rank restriction.

Second, a scheduling method based on rank recommendation and rank restriction, and a structure of a scheduler.

Third, an uplink control signaling on a Physical Uplink Control Channel (PUCCH) and a Physical Uplink Shared Channel (PUSCH) to enable rank recommendation and rank restriction in a practical set-up, such as an LTE-Advanced, and a structure of a frame.

Fourth, a higher layer signaling, more particularly, a message exchange procedure and a signaling method over an X2 interface that allows communication between base stations, that is, eNBs.

RANK Feedback and CQI Computation

As described above, the RANK information may be reported from the terminal to the serving eNB. In addition, several pieces of CQI may be reported to help link adaptation in case a request for rank recommendation and rank restriction is accepted by an interfering cell. Hereinafter, various RANK feedback methods and CQI computation methods will be described.

1. Separate Selection of RANK and RI

For example, a terminal may assume inter-cell interference as an identity matrix, may select an RI to maximize a wideband channel throughout and CQI, may assume random precoders, and may select an RANK based on wideband CQI. After the RI and the RANK are selected, CQI(s) feedback may be computed as follows.

Option 1: a single piece of wideband CQI or a single piece of subband CQI may be computed based only on the RI. This option may be applicable to a system that does not rely on coordination, for example, a case that assumes an interference cell precoder is an identity matrix.

Option 2: a single piece of wideband CQI or a single piece of subband CQI may be computed based on the RI and the RANK.

Option 3: a single piece of wideband CQI or a single piece of subband CQI plus a single piece of wideband differential CQI and a single piece of subband differential CQI may be computed. In this example, the wideband CQI or the subband CQI may be computed based on only the RI in a system that does not rely on coordination, for example, a case that assumes an interference cell precoder is an identity matrix. The wideband differential CQI or subband differential CQI may be computed based on the RI and the RANK.

2. Joint selection of RI and RANK

For example, the terminal may assume a random precoder of interference cells, and may select an RI and an RANK to maximize wideband CQI. After joint selection of the RI and the RANK, CQI(s) feedback may be computed as follows.

Option 1: a single piece of wideband CQI or a single piece of subband CQI may be computed based only on the RI. This option may be applicable to a system that does not rely on coordination, for example, a case that assumes that an interference cell precoder is an identity matrix.

Option 2: a single piece of wideband CQI or a single piece of subband CQI may be computed based on the RI and the RANK.

Option 3: a single piece of wideband CQI or a piece of subband CQI plus a single piece of wideband differential CQI and a single piece of subband differential CQI may be computed. In this example, the wideband CQI and the subband CQI may be computed based only on the RI in a system that does not rely on coordination. The differential wideband CQI and the subband differential CQI may be computed based on the RI and the RANK Scheduler Architecture To obtain a gain from rank restriction and rank recommendation, the scheduler may need to take account of the following issues.

When a scheduler of a given eNB A accepts a request for a recommended rank and a restricted rank from neighbor cells in a frequency f and at a time t, terminals of the neighbor cells that report the recommended rank and restricted rank to the eNB A may be scheduled in the frequency f and at the time t. Otherwise, the gain may not be expected from the rank restriction and the rank recommendation.

A predetermined form with respect to coordination or synchronization may be required among eNBs.

In a case of a strong coordination, an iterative structure that successively updates scheduled terminals, precoders and ranks of the scheduled terminals based on information reported by neighbor cells in a previous iteration may be used.

In a case of a weak coordination, eNBs may have a predetermined rule to follow. The predetermined rule may be a code of conduct of the eNBs to mutually benefit from the report of the recommended rank and restricted rank. The code of conduct may be sufficiently simple to support an iterative structure of the scheduler in a dynamic fashion. Exemplary embodiments may provide several possible codes of conduct.

Master-Slave Architecture

A scheduling method according to an exemplary embodiment may be based on the master-slave architecture. In the maser-slave architecture, a single eNB may act as a master and remaining eNBs may act as slaves in each time instant.

1) Operation of Master eNB

The master eNB may determine a predetermined transmission Rank (R) based on reported recommended rank and restricted rank, and may schedule, based on R, scheduled terminals to enable as many terminals as possible to have R.

CoMP terminals and non-CoMP terminals may be scheduled by the master eNB.

For the master eNB, a scheduler may be a single cell scheduler having a priority to schedule as many rank-R terminals as possible. The scheduling may be performed, in a whole bandwidth, based on a Frequency Division Multiple Access (FDMA) scheme, that is, a plurality of terminals may share a bandwidth and preferred resources may be allocated to the plurality of terminals based on the reported information. The scheduler may classify terminals into a plurality of groups based on RIs reported by the terminals. A group having an RI equal to R may be scheduled with a first priority.

2) Operation of Slave eNB

A slave eNB that is aware that the master eNB will accept a predetermined recommended rank and restricted rank and may schedule, with a first priority, CoMP terminals that request rank restriction and rank recommendation from the slave eNB.

For the slave eNB, a scheduler may be a single cell scheduler that schedules, with a first priority, CoMP terminals of which an aggressor is the master eNB. The scheduling may be performed based on the FDMA scheme in the whole bandwidth. The terminals may be classified into a plurality of groups. The terminals may be classified as a group of the CoMP terminals of which the aggressor is the master eNB and a group of remaining terminals including non-CoMP terminals and CoMP terminals of which the aggressor is different from the master eNB. The group of the CoMP terminals of which the aggressor is the master eNB may be scheduled with a first priority.

In a next time interval, the previous master eNB may become a slave eNB and the previous slave eNB may become a master eNB.

The master-slave architecture may be described based on following examples.

An eNB1 may have a priority for accepting the recommended rank and restricted rank in an order of a rank 2, a rank 1, a rank 3, and a rank 4. The eNB1 may receive a relatively large number of requests for transmission and non-transmission using the rank 2. In a case of the recommended rank, the eNB1 may determine R to be cycled in an order of the rank 2, the rank 1, the rank 3, and the rank 4. A priority of the rank 2 is high and thus counts of a case having a transmission rank R equal to 2 may be relatively high. In this example, the eNB1 may determine to perform transmission to enable R to be cycled, for example, in an order of the rank 2, the rank 1, the rank 2, the rank 1, and the rank 3.

An eNB2 may have a priority for accepting the recommended rank and restricted rank in an order of the rank 1, the rank 2, the rank 3, and the rank 4. The eNB2 may receive a relatively large number of requests for transmission using the rank 1. In a case of the recommended rank, the eNB2 may determine R to be cycled, for example, in the order of the rank 1, the rank 2, the rank 3, and the rank 4.

An eNB3 may have a priority for accepting the recommended rank and restricted rank in an order of the rank 3, the rank 1, the rank 4, and the rank 2. The eNB3 may receive a relatively large number of requests for transmission using the rank 3. In a case of the recommended rank, the eNB3 may determine R to be cycled, for example, in the order of the rank 3, the rank 1, the rank 4, and the rank 2.

The eNB1 may be the master eNB in a time interval 1, for example, a subframe 1, and a time interval 4. The eNB2 may be the master eNB in a time interval 2 and a time interval 5. The eNB3 may be the master eNB in a time interval 3 and a time interval 6.

An example of the master-slave architecture using rank recommendation and rank restriction is illustrated in Table 1.

TABLE 1

| eNB | Time | | | | | |
|---|---|---|---|---|---|---|
| | 1 | 2 | 3 | 4 | 5 | 6 |
| eNB1 | Master, R = 2 | Slave | Slave | Master, R = 1 | Slave | Slave |
| eNB2 | Slave | Master, R = 1 | Slave | Slave | Master, R = 2 | Slave |
| eNB3 | Slave | Slave | Master, R = 3 | Slave | Slave | Master, R = 1 |

According to the master-slave architecture, two schedulers may exist: a cluster-based scheduler and a network-based scheduler.

Cluster-Based Scheduler

In the cluster-based scheduler, a network may be divided into clusters that are defined in advance. An example of an intra-site clustering and an example of an inter-site clustering are illustrated in FIG. 1 and FIG. 2, respectively.

Figure 2:
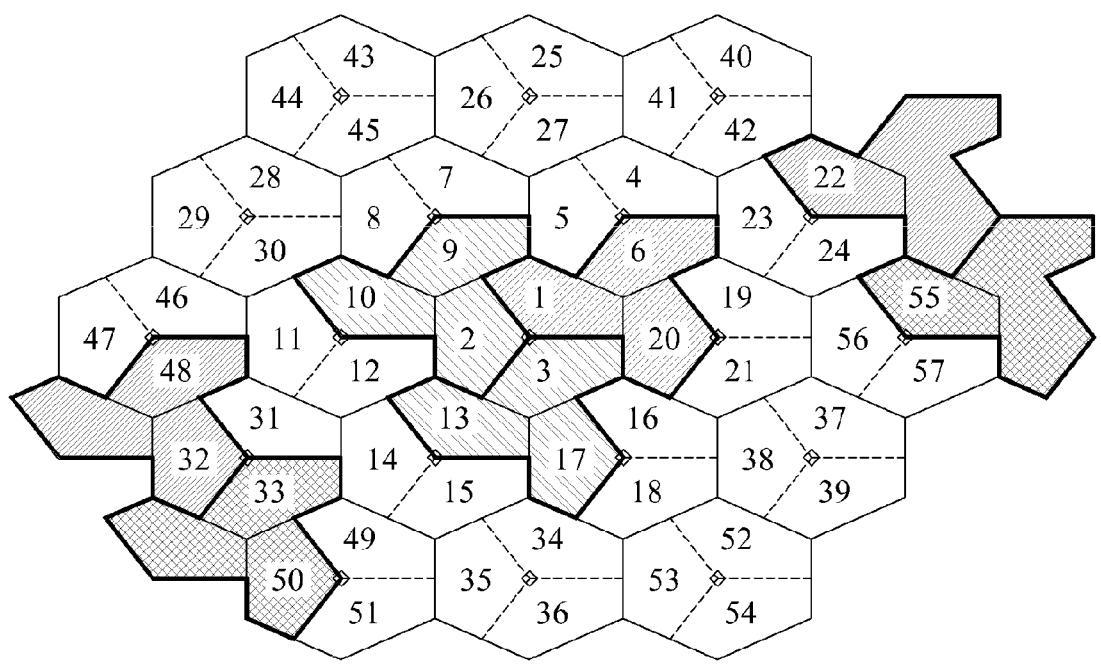
FIG. 2 is a diagram illustrating an inter-site clustering according to an exemplary embodiment of the present invention.

FIG. 1 illustrates an intra-site clustering according to an exemplary embodiment of the present invention, and FIG. 2 illustrates an inter-site clustering according to an exemplary embodiment of the present invention.

Referring to FIGS. 1 and 2, each hexagon may denote a single site. The single site may include three eNBs. For example, a first site 110 may include an eNB1, an eNB2, and an eNB3. A number included in each hexagon may denote a number of an eNB.

According to the intra-site clustering of FIG. 1, a single site corresponds to a single cluster. For example, the eNB1, the eNB2, and the eNB3 may form a single cluster and an eNB4, an eNB5, and an eNB6 may form another cluster.

According to the inter-site clustering of FIG. 2, eNBs included in different sites are included in a single cluster. For example, an eNB1, an eNB6, and an eNB20 included in different sites form a single cluster, and an eNB2, an eNB9, and an eNB10 included in different sites form another cluster.

It is assumed that the master-slave architecture is used and a cluster is formed with three eNBs as illustrated in FIGS. 1 and 2, a cluster-based scheduler for rank recommendation may operate as follows. The same principle may also be applicable to a cluster-based scheduler for rank restriction.

In a given time instant, a single master eNB (master eNB M) and two slave eNBs, for example, S1 and S2, may exist.

RI may denote a rank indicator transmitted, to a serving base station M, by terminals, that is, mater terminals, corresponding to the master eNB M.

RANK may denote an interference rank recommended, to an interfering base station M, by terminals corresponding to S1 and S2. It is assumed that only RANKs corresponding to interference cells included in a cluster are reported.

[R1,R2,R3,R4] may denote a priority with respect to RANKs. The priority may be obtained based on a set of RANK information shared by adjacent eNBs in the cluster. For example, when [R1,R2,R3,R4]=[2,1,3,4], a most frequently reported recommended RANK is a rank 2.

R may be a transmission rank determined by the master eNB M. Values of R may vary over time, for example, [R1,R2,R1,R2,R3]. The master eNB M may determine change in the transmission rank in an order of R1, R2, R1, R2, and R3.

<Operation of Master eNB M>

The master eNB M may classify master terminals into two groups:

UE (M) 1: a set of terminals, each of which has an IR equal to a current R.

UE (M) 2: a set of remaining terminals.

Subsequently, the master eNB M may schedule the master terminals as follows.

CASE 1: When the UE(M) 1 is not empty, only terminals included in the UE(M) 1 may be scheduled. For example, the scheduling may be performed based on a Proportional Fair (PF) in a frequency domain until all frequency resources are allocated. In this example, terminals to be scheduled may be the only terminals included in the UE(M) 1.

CASE 2: When the UE(M) 1 is empty, only terminals included in the UE(M) 2 may be scheduled. For example, the scheduling may be performed based on the PF in the frequency domain until all frequency resources are allocated. In this example, terminals to be scheduled may only be the terminals included in the UE(M) 2.

<Operation of Slave eNB Si (i=1 and 2)>

The slave eNB Si (i=1 and 2) may classify slave terminals as follows:

NonCoMP_UE(i): a set of all non-CoMP terminals.

CoMP_UE(i) 1: a set of CoMP terminals which are connected to the master eNB M and of which the RANKs are equal to R.

CoMP_UE(i) 2: a set of remaining CoMP terminals, for example, terminals that are not connected to the master eNB M among the CoMP terminals and terminals of which the RANKs are unequal to R although the terminals are connected to the master eNB M.

The slave eNB Si may schedule the terminals included in the Si as follows.

1) When the CASE 1 is performed in the master eNB M, the slave eNB Si may perform scheduling in an order of a CoMP terminal (i) 1, a NonCoMP_terminal(i), and a CoMP terminal (i) 2. When a terminal exists in the CoMP terminal(i), scheduling may be performed with respect to only terminals included in the CoMP terminal(i). When a terminal is nonexistent in the CoMP terminal(i), scheduling may be performed with respect to terminals included the NonCoMP_terminal(i) that is a group with a second priority.

2) When the CASE 2 is performed in the master eNB M, the slave eNB Si may schedule all terminals without a priority.

Accordingly, R of the master eNB M may become to be equal to an RANK recommended by S1 and S2.

Figure 3:
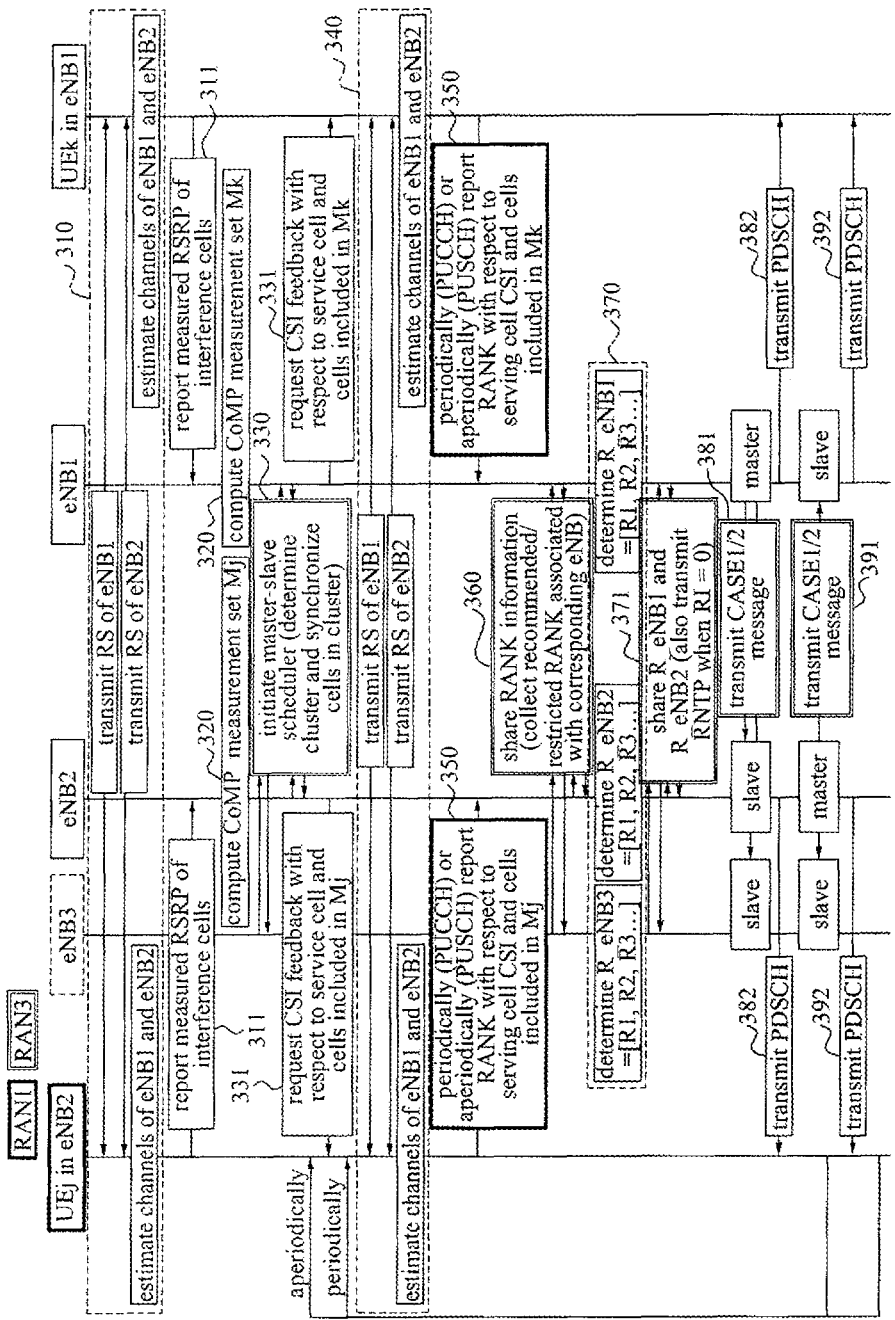
FIG. 3 is a flowchart illustrating a cluster-based scheduling method according to an exemplary embodiment of the present invention.

FIG. 3 illustrates a cluster-based scheduling method according to an exemplary embodiment of the present invention.

Referring to FIG. 3, an eNB1, a UEk, that is a terminal corresponding to the eNB1, an eNB2, and a UEj, that is a terminal corresponding to the eNB2, may exist.

Each of the eNBs may transmit a Reference Signal (RS), and terminals, that is, the UEj and the UEk, may estimate channels from the eNBs in step 310.

The terminals may report, to a serving eNB, the Reference Signal Received Power (RSRP) measured with respect to interference cells in step 311. The eNBs may determine a CoMP measurement set, that is, Mj and Mk, in step 320.

A master-slave scheduler may be initiated. A cluster may be determined and cells in the cluster may be synchronized in step 330.

The eNB1 may request, from the UEj, Channel State Information (CSI) feedback with respect to a serving cell and cells included in the Mj, and the eNB2 may request, from the UEk, CSI feedback with respect to a serving cell and cells included in the Mk in step 331.

Subsequently, the eNBs transmit the RSs and the terminals estimate the number of channels in step 340.

The UEj may report RANKs with respect to the cells included in a service cell CSI and Mj to the eNB2 periodically, using a PUCCH or aperiodically, using a PUSCH in step 350. In this example, differential CQI may be selectively reported. In this manner, the UEk may report RANKs to the eNB1.

The eNBs may share RANK information. More particularly, each of the eNBs may only collect recommended and restricted RANK information with respect to a corresponding eNB in step 360.

The eNBs may determine an order of transmission ranks in step 370. Each of the eNBs may share information associated with the order of the transmission ranks. In this example, when an RI is equal to 0, RNTP may also be transmitted in step 371.

When the eNB1 is a master eNB, a message indicating whether scheduling of the eNB1 is CASE 1 or CASE 2 may be transmitted to eNB2 and the eNB3 that are slave eNBs in step 381. The eNB2 and the eNB3 may perform scheduling based on the message from the eNB1, and the eNB2 and eNB3, as well as the eNB1 may transmit necessary information in a Physical Downlink Shared Channel (PDSCH) in step 382.

In a next time interval, the master eNB and the slave eNB may be changed. When the eNB2 is changed to the master eNB, a message indicating whether scheduling of the eNB2 is CASE 1 or CASE 2 may be transmitted to the eNB1 and the eNB3, that are slave eNBs, in step 391. The eNB1 and the eNB3 may perform scheduling based on the message from the eNB2, and the eNB2 and eNB3, as well as the eNB1 may transmit necessary information in a PDSCH in step 392.

Figure 4:
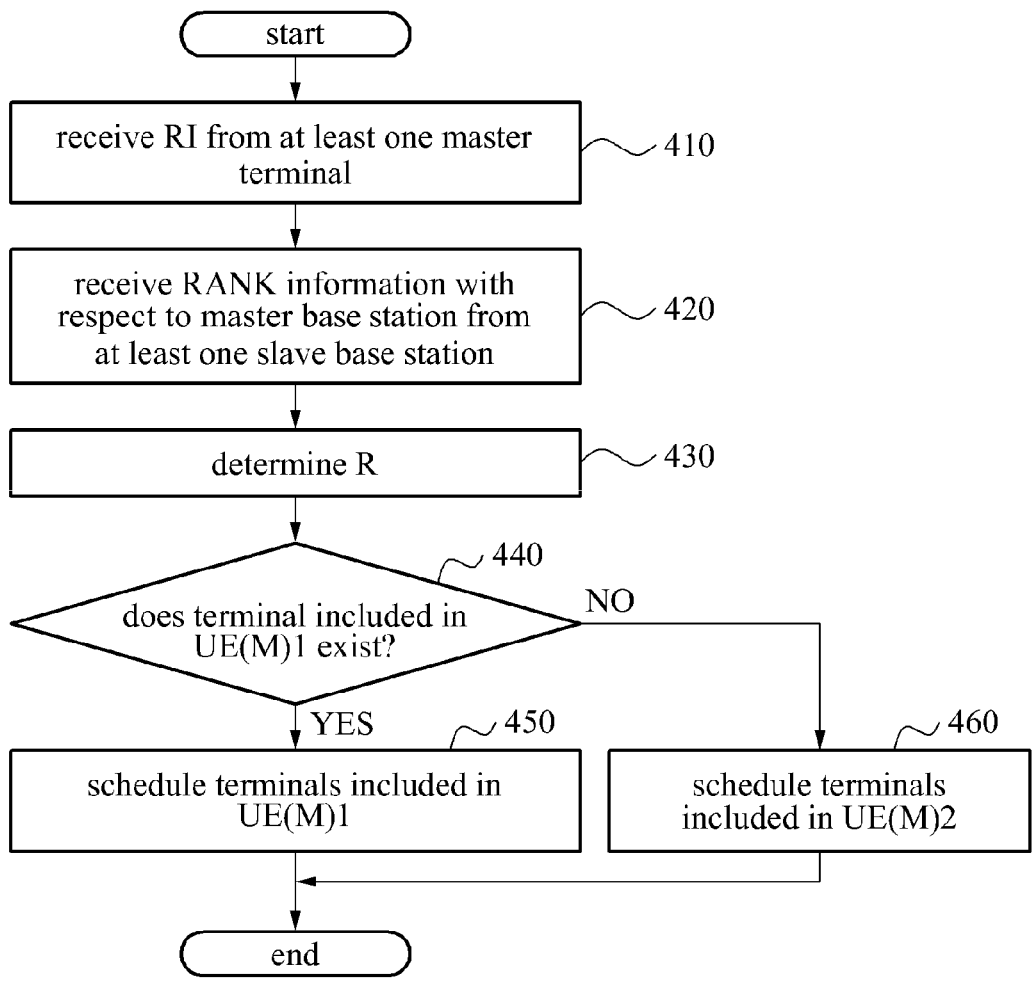
FIG. 4 is a flowchart illustrating an operation of a master base station that performs cluster-based scheduling according to an exemplary embodiment of the present invention.

FIG. 4 illustrates an operation of a master base station that performs cluster-based scheduling according to an exemplary embodiment of the present invention.

Referring to FIG. 4, the master base station may receive information associated with a preferred RI from at least one master terminal corresponding to the master base station in step 410.

The master base station may receive information associated with an RANK with respect to the master base station, from at least one slave base station in step 420.

The master base station may determine R in step 430. In this example, the master base station may determine R based on the information associated with the RANK and the RI.

The master base station may determine whether a terminal of which RI is equal to R exists, in step 440. That is, the master base station may determine whether a terminal included in the UE(M)1 exists.

If it is determined in step 440 that a terminal included in the UE(M)1 exists, the master base station may schedule terminals included in the UE(M)1 in step 450.

If it is determined in step 440 that a terminal does not exist in the UE(M)1, the master base station may schedule remaining terminals, that is, terminals included in the UE(M)2 in step 460.

Figure 5:
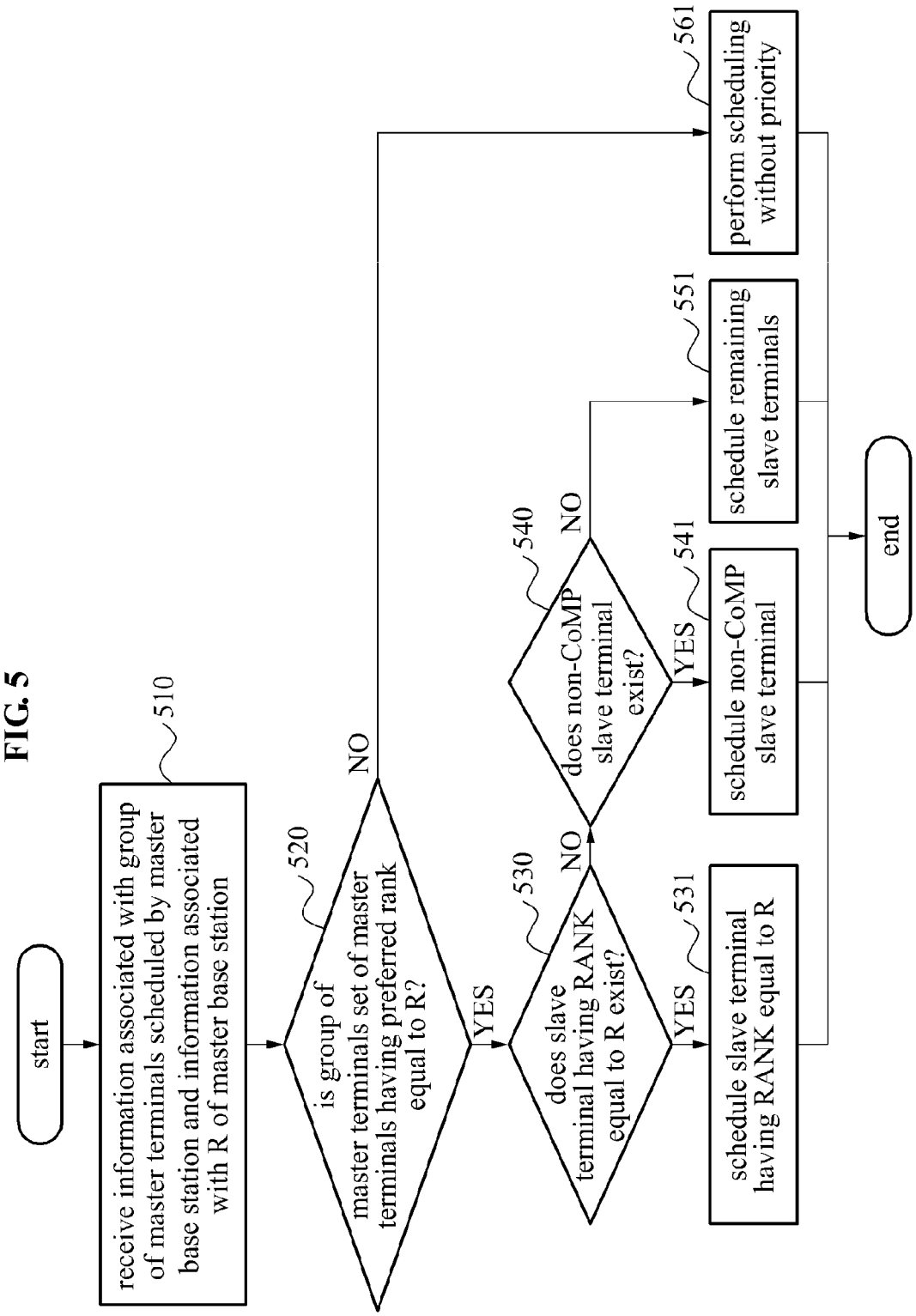
FIG. 5 is a flowchart illustrating an operation of a slave base station that performs cluster-based scheduling according to an exemplary embodiment of the present invention.

FIG. 5 illustrates an operation of a slave base station that performs cluster-based scheduling according to an exemplary embodiment of the present invention.

Referring to FIG. 5, the slave base station may receive, from a master base station, information associated with a group of master terminals scheduled by the master base station and information associated with R of the master base station in step 510.

The slave base station may determine whether the group of the master terminals is a set of master terminals, each of which has a preferred rank equal to R of the master base station in step 520.

If it is determined in step 520 that the group of the master terminals is the set of the master terminals, each of which has the preferred rank equal to R of the master base station, the slave base station operates as follows.

The slave base station may determine whether a slave terminal having an RANK equal to R exists in step 530. If it is determined in step 530 that the slave terminal having the RANK equal to R exists, the slave base station may perform scheduling with respect to the corresponding slave terminal in step 531.

On the other hand, if it is determined in step 530 that the slave terminal having the RANK equal to R is nonexistent, the slave base station may determine whether a non-CoMP slave terminal, that is, a slave terminal that does not perform coordination, exists in step 540. If it is determined in step 540 that the non-CoMP slave terminal exists, the slave base station may perform scheduling with respect to the corresponding slave terminal in step 541.

On the other hand, if it is determined in step 540 that the non-CoMP slave terminal does not exist, the slave base station may perform scheduling with respect to remaining terminals in step 551, and the remaining terminals may include a slave terminal that performs coordination with the master base station but has an RANK unequal to R and a slave terminal that performs coordination with a different base station.

If it is determined in step 520 that the group of the master terminals is not a set of master terminals, each of which has a preferred rank unequal to R of the master base station, the slave base station may perform scheduling with respect to slave terminals without priority in step 561.

In many scenarios, a time section having an RANK equal to 1 is most frequently reported. This may show that a terminal may not report the RANK and may compute RI by assuming that the RANK is 1. An eNB may use information indicating that the RANK equal to 1 is an RANK preferred by all CoMP terminals. When all eNBs are aware of a number of CoMP terminals in corresponding cells and aggressor cells of the terminals corresponding to the eNBs, a scheduler may operate well by assuming that the CoMP terminals report that RANK is equal to 1, although the RANK is not actually reported.

The scheduler may need to take account of following issues.

- A cluster may be determined before scheduling is performed. A synchronization between the master eNB and a slave eNB, and a synchronization between a changed master eNB and a changed slave eNB may be performed among eNBs.
- A terminal may periodically or aperiodically report RANK information and several pieces of optional differential CQI to a corresponding eNB.
- An RANK reported by the terminal to a serving eNB may be shared by eNBs in the cluster. An eNB A may collect all recommended and restricted RANK information associated with the eNB A.
- R used by the master eNB may be shared by the eNBs in the cluster. S1 and S2 may obtain information associated with the transmission rank R of the master eNB, such as [R1, R2, R1, R2, R3]. When R is equal to 0, that is, in a case of silencing, additional information, such as, an RNTP message, may be transmitted to eNBs to provide information associated with a resource where the silencing is performed. A frequency for sharing R may be determined.
- A 1-bit indicator may be used to inform S1 and S2 of whether scheduling of the master eNB M is CASE 1 or CASE 2.
- A higher layer signaling may be requested to indicate a case that a terminal needs to compute RI based on a scheme different from a basic scheme. This may be used when a joint selection of the RI and the RANK is performed.

A process that reports the RANK information and the optional differential CQI via a PUCCH or a PUSCH will be described with reference to an uplink control signaling. A message for communication between the eNBs, and shared information associated with RANK, [R1, R2, R1, R2, R3] that is a transmission rank, and information indicating whether scheduling may be one of CASE 1 or CASE 2 will also be described with reference to the higher layer signaling.

For example, in a case of 3GPP LTE Rel-8, an extra overhead of 2 bits may be expended to transmit information associated with a recommended RANK. The extra overhead of 2 bits may be readily handled by even terminals included in an edge of a cell through the PUCCH.

Network-Based Scheduler

The cluster-based scheduling method may be applied to a rank recommendation and rank restriction scheme to each cluster, independently, from other clusters. This method may not take account of interference between clusters. A network-base scheduling method, that is, a method that applies the cluster-based scheduling method to an overall network, will be described. The network-based scheduling method may use a master-slave architecture in the similar manner as the cluster-based scheduling method. However, all eNBs may be included in groups determined in advance, unlike a sector-based scheduling method. For example, the all eNBs may be classified into three groups as illustrated in FIG. 6.

Figure 6:
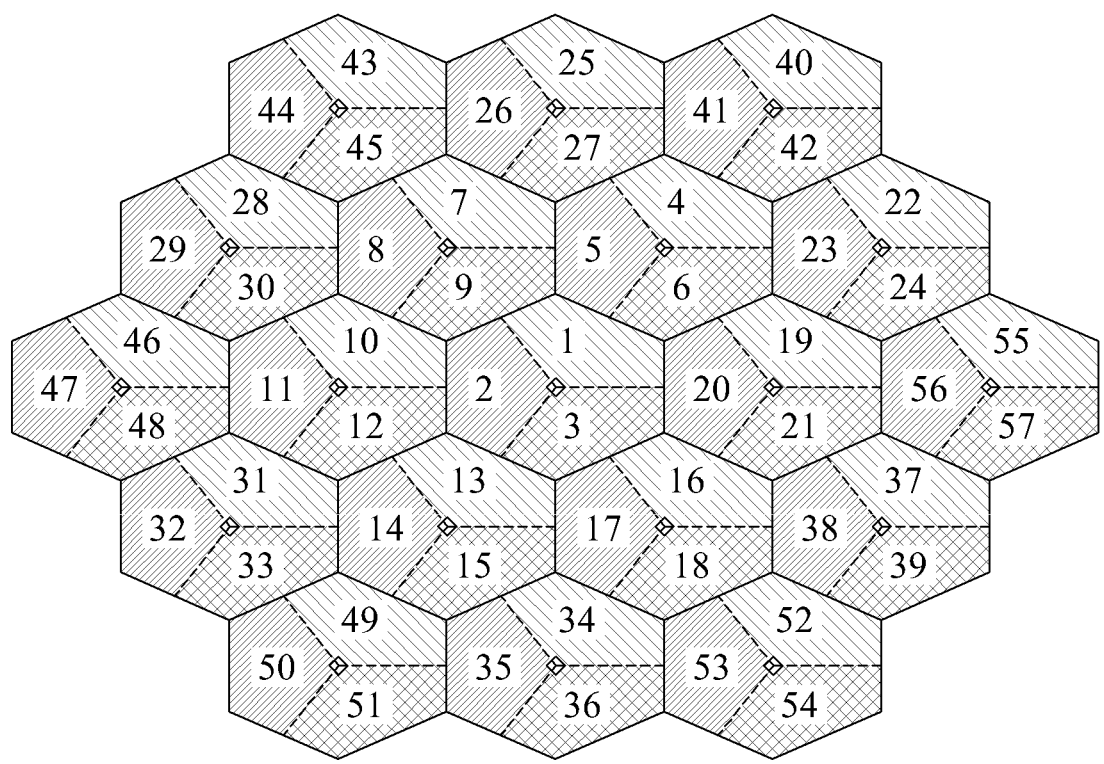
FIG. 6 is a diagram illustrating a group of enhanced Node Bs (eNBs) in a network-based scheduling according to an exemplary embodiment of the present invention.

FIG. 6 illustrates a group of eNBs in a network-based scheduling according to an exemplary embodiment of the present invention.

Referring to FIG. 6, each hexagon may denote a single site. The single site may include three eNBs. A number included in each hexagon may denote a number of an eNB.

An eNB1, an eNB 4, an eNB 7, an eNB10, and the like may be included in a group 1, and an eNB 2, an eNB 5, an eNB 8, an eNB11, and the like may be included in a group 2, and an eNB 3, an eNB 6, an eNB 9, an eNB12, and the like may be included in a group 3.

In each time interval, eNBs included in a single group, that is, a master group, may operate as master eNBs, and eNBs included in remaining groups, that is, slave groups, may operate as slave eNBs. Codes of conduct of the eNBs for the rank recommendation and rank restriction will be described.

According to the master-slave architecture, the network-based scheduler for a rank recommendation may operate as follows. The same principle may also be applicable to the cluster-base scheduler for a rank restriction.

In a given time interval, a single master group and two slave groups exist.

Each terminal may determine RI and an RANK in the same manner as the cluster-based scheduling method.
  eNBs may exchange information associated with RI and RANK information associated with the RANK with each other.

Each master eNB may determine a priority of interference rank that is expressed as [R1, R2, R3, R4], based on the RANK information from adjacent eNBs. Each master eNB may determine R to enable [R1, R2, R3, R4] to be cycled, based on the priority of the interference rank. For example, when [R1, R2, R3, R4]=[2, 1, 3, 4], a most frequently reported recommended RANK is a rank 2.
  a current R may be shared by adjacent slave eNBs.
  <Definition of Subsets of Terminals Corresponding to ENB>

Terminals corresponding to a master eNB M may be classified into two subsets:
  UE(M) 1: a set of terminals, each of which has RI equal to the current R.
  UE(M) 2: a set of remaining terminals.

Terminals corresponding to the slave eNBs may be classified into three subsets as follows. In this example, a subset with respect to the master eNBs is defined in advance. With respect to a given terminal k, a Master_eNB(k) may be the subset of master eNBs to which the terminal k is connected as a CoMP terminal. The Master_eNB(k) may be an intersection of a set of the master eNBs and a set of eNBs performs CoMP with the terminal k.
  CoMP_UE(s) 1: a set of CoMP terminals, each of which has an RANK with respect to a corresponding master eNB equal to the current R of a master terminal
  CoMP_UE(s) 2: remaining CoMP terminals, that is, a terminal that is not connected to any master eNB included in Master_eNB(k) or a terminal that is connected to a master eNB included in Master_eNB(k) and that has an RANK unequal to an R of the corresponding master eNB.
  NonCoMP_UE(s): all non-CoMP terminals.
  <Scheduling Operation of Master ENB M>
  When a terminal is included in UE(M), the master eNB M may perform scheduling with respect to only the master terminals included in the UE(M) 1. The scheduling may be performed based on a PF in a frequency domain until all frequency resources are allocated. In this example, the terminals to be scheduled may be only the terminals included in the UE(M) 1.
  When a terminal included in the UE(M) is nonexistent, the master eNB M may perform scheduling with respect to master terminals included in the UE(M) 2.
  <Scheduling Operation of Slave ENBS>

The slave eNBs may perform scheduling in an order of the CoMP_UE(s) 1, the Non_CoMP_UE(s), and the CoMP_UE(s) 2. When a terminal included in the CoMP_UE(s) exists, a slave eNB may schedule only the terminals included in the CoMP_UE(s) 1. When a terminal included in the CoMP_UE(s) 1 exists, the slave eNB may schedule only the terminals included in the Non_CoMP_UE(s). When a terminal included in the CoMP_UE(s) 1 or the Non_CoMP_UE(s) is nonexistent, the slave eNBs may schedule terminals included in the CoMP_UE(s) 2.

Accordingly, R of the eNB M may become equal to an RANK recommended by the adjacent slave eNBs.

For ease of description, a case in which a terminal included in the UE(M) 1 is nonexistent has not been described. When a terminal included in the UE(M) 1 of an adjacent master eNB is nonexistent, that is, when the master eNB does not use rank a recommendation and restriction scheme and performs conventional scheduling, a network system throughout may be increased by appropriately modifying the scheduling at the slave eNBs.

The network-based scheduling may be performed in a similar manner as the cluster-based scheduling of FIG. 3. The master eNB in the cluster-based scheduling may relieve interference from adjacent slave eNBs in a cluster, whereas the master eNB in the network-based scheduling may relieve interference generated by all adjacent slave eNBs regardless of the cluster.

Uplink Control Signaling

The scheduler may operate based on a report of RANK information. Each of the terminals may report RANK information and several optional differential CQI to a corresponding service eNB periodically using a PUCCH or aperiodically using a PUSCH. An exemplary process that reports the information to a serving eNB through the PUCCH and the PUSCH will be described.

Aperiodic Report of CQI/PMI/RI Via PUSCH

In 3GPP LTE ReL-8, a terminal is semi-statically configured by higher layers to feed back CQI, PMI, and a corresponding RI through the same PUSCH using one of feedback modes given in Table 2 that is based on Technical Specification (TS) 36.213.

TABLE 2

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

In CoMP that uses rank recommendation and rank restriction, the terminal may feed back the CQI, the PMI, and the corresponding RI through the same PUSCH. The RI and RANK may be jointly encoded or may be separately encoded.

A feedback framework based on two matrixes, that is, W1 and W2, may be possible. In the feedback framework, the feedback of the RANK information may be performed by joint encoding of the RI, the RANK, and W1, or may be performed by separate encoding of the RI, the RANK, and W1. Examples of the joint encoding will be described with reference to the PUCCH.

Periodic Report of CQI/PMI/RI Via PUCCH

In 3GPP LTE ReL-8, a terminal is semi-statically configured by higher layers to periodically feed back differential CQI, PMI, and a corresponding RI through the same PUCCH using feedback modes given in Table 3 that is based on TS 36.213.

TABLE 3

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

Candidate report modes to support rank recommendation and rank restriction on the PUCCH will be described. A scenario that only reports additional information associated with the RANK that is referred to as 'RANK report only' and a scenario that reports the RANK and several piece of additional differential CQI or delta CQI that is referred to as 'RANK=differential CQI report' will be described.

A quantity RANK may include a recommendation rank and a restriction rank for a single or a plurality of interference cells. The quantity RANK may be a set of $RANK_{13}$ cell 1, $RANK_{13}$ cell 2, ..., and the like. In this example, the cell 1 and the cell 2 may be interference cells to which the recommendation rank and restriction rank are reported. When the same RANK is applied to all interference cells, the RANK may be a single entry.

Feeding back of the RANK using either the same subframe as the RI or a different subframe from the RI may be efficient.

The rank recommendation and rank restriction scheme may be applied to all PMI feedback types including a No PMI feedback type (Mode 1-0 and Mode 2-0) and a PMI feedback type (Mode 1-1 and Mode 2-1). Therefore, a No PMI case and a PMI feedback case will be described. In both cases, a case where 'RANK report only' is performed and a case where 'RANK+differential CQI report' is performed will be described.

In an Open Loop-Multiple Input Multiple Output (OL-MIMO) case, that is, in the No PMI case, although a transmission diversity scheme is an Alamouti precoding scheme, the rank recommendation and rank restriction scheme may operate well. Although the Alamouti precoding scheme is defined as a rank 1 transmission in the LTE standard, the terminal may recognize the Alamouti precoding scheme as a rank 2 transmission, that is, a 2 layer transmission. Therefore, a definition of the RI and the RANK may be different. The RANK may be understood as a number of transmitted layers.

For ease of description, the transmission rank reported by the serving cell based on the RI is assumed to be equal to a reception RANK that terminals of neighbor cells recognize as the same signal.

For example, even through the serving cell recognizes the Alamouti precoding scheme as the rank 1 transmission, the terminals of the neighbor cells may recognize the Alamouti precoding scheme as the rank 2 transmission. Therefore, the transmission rank recognized by the serving cell and transmission rank recognized by the neighbor cells may be different from each other. However, the proposed scheme may operate properly. For example, in a case of the Alamouti transmission, the proposed scheme may operate properly as long as two data streams of the Alamouti code are independent from each other.

1. No PMI Feedback

Table 4 shows possible candidate report modes for the No PMI case. 'no subband report' may be an approach similar to Mode 1-0, and 'subband report' may be an approach similar to Mode 2-0. Hereinafter, CQI_w may denote wideband CQI, CQI_s may denote subband CQI, CQI_wd may denote wideband differential CQI, and CQI_sd may denote subband differential CQI.

TABLE 4

| PMI feedback Type (No PMI, PMI) | rank recommen- dation/ restriction feedback informa- tion | subband/ no subband report | W1/W2 in same or separate sub- frames | | RI and RANK in same or separate sub- frames | reporting modes |
| --- | --- | --- | --- | --- | --- | --- |
| | | | | | | CQI_w: wideband CQI |
| | | | | | | CQI_s: subband CQI |
| | | | | | | CQI_wd: wideband diff. CQI for RANK rec./restr. |
| | | | sub- frames | W2_s/ W2_w | sub- frames | CQI_sd: subband diff. CQI for RANK rec./restr. |
| No PMI | rank report only | No subband report | NA | NA | RI and RANK in separate sub- frames | RI ∥ RANK ∥ CQI_w |
| | | | | | RI and RANK in same sub- frame | RI_RANK ∥ CQI_w |

TABLE 4-continued

| PMI feedback Type (No PMI, PMI) | rank recommen- dation/ restriction feedback informa- tion | subband/ no subband report | W1/W2 in same or separate sub- frames | W2_s/ W2_w | RI and RANK in same or separate sub- frames | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|---|
| | | subband report (CQI) | | | RI and RANK in separate sub- frames | RI \|\| RANK \|\| CQI_w \|\| CQI_s |
| | | | | | RI and RANK in same sub- frame | RI, RANK \|\| CQI_w \|\| CQI_s |
| | rank + differential CQI report | No subband report | NA | NA | RI and RANK in separate sub- frames | RI \|\| RANK \|\| CQI_w, CQI_wd RI \|\| RANK \|\| CQI_w \|\| CQI_wd |
| | | | | | RI and RANK in same sub- frame | RI, RANK \|\| CQI_w, CQI_wd RI, RANK \|\| CQI_w \|\| CQI_wd |
| | | subband report (CQI) | | | RI and RANK in separate sub- frames | RI \|\| RANK \|\| CQI_w, CQI_wd \|\| CQI_s RI \|\| RANK \|\| CQI_w, CQI_wd \|\| CQI_s, CQI_sd RI \|\| RANK \|\| CQI_w, CQI_wd \|\| CQI_s \|\| CQI_sd RI \|\| RANK \|\| CQI_w \|\| CQI_wd \|\| CQI_s RI \|\| RANK \|\| CQI_w \|\| CQI_wd \|\| CQI_s, CQI_sd RI \|\| RANK \|\| CQI_w \|\| CQI_wd \|\| CQI_s \|\| CQI_sd |
| | | | | | RI and RANK in same sub- frame | RI, RANK \|\| CQI_w, CQI_wd \|\| CQI_s RI, RANK \|\| CQI_w, CQI_wd \|\| CQI_s, CQI_sd RI, RANK \|\| CQI_w, CQI_wd \|\| CQI_s \|\| CQI_sd RI, RANK \|\| CQI_w \|\| CQI_wd \|\| CQI_s RI, RANK \|\| CQI_w \|\| CQI_wd \|\| CQI_s, CQI_sd RI, RANK \|\| CQI_w \|\| CQI_wd \|\| CQI_s \|\| CQI_sd |

In Table 4, the shaded section may denote relatively strong candidates.

Several cases in Table 4 will be described as follows.

<No Subband Report>

1) Reporting mode RI,RANK||CQI_w

The RI and the RANK may be reported in the same subframe. The RI and the RANK may be jointly encoded or may be separately encoded.

Information associated with the IR and the RANK and information associated with the CQI_w may be reported in different subframes.

1-1) Reporting mode RI||RANK||CQI_w

The RI, the RANK, and CQI_w may be reported in three different subframes.

<ubband eport>

2) Reporting mode RI,RANK||CQI_w||CQI_s the RI and the RANK may be reported by the same subframe. The RI and the RANK may be joinly encoded or may be separately encoded.

Information associated with the IR and the RANK, information associated with CQI_w, and information associated with the CQI_s may be reported in three different subframes.

2-1) Reporting mode RI‖RANK‖CQI_w‖CQI_s

The RI, the RANK, CQI_w, and CQI_s may be reported in four different frames.

2. PMI Feedback

A matrix W1 (W1) associated with a subband or short term information or a matrix W2 (W2) associated with a wideband or long term information may be used. All possible candidate modes will be described.

In this example, the possible candidate modes may be catergorized based on 'no subband report' and 'subband report', and based on whether W1 and W2 are reported in separate subframes or the same subframes. An additional category may be obtained based on whether W2 is to be used as wideband information or subband information. When W2 is used as the wideband information, W2 may be denoded by W2_w. When W2 is used as the subband information, W2 may be denoded by W2_s. 'A‖B' may denote that information A and information B may be reported in different subframes.

'no subband report' may be an approach similar to Mode 1-1, and 'subband report' may be an approach similar to Mode 2-1.

Table 5 may show all possible candidate modes for PMI case.

TABLE 5

| PMI feedback Type (No PMI, PMI) | rank recommendation/ restriction feedback information | subband/ no subband report | W1/W2 in same or separate subframes | W2_s/ W2_w | RI and RANK in same or separate subframes | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|---|
| PMI | rank report only | No subband report | W1 and W2 in separate subframes | W2_w | RI and RANK in separate subframes | RI, W1 ‖ RANK ‖ W2_w, CQI_w<br>RI ‖ RANK ‖ W1 ‖ W2_w, CQI_w |
|  |  |  |  |  | RI and RANK in same subframe | RI, RANK, W1 ‖ W2_w, CQI_w<br>RI, RANK, W1 ‖ W2_w, CQI_w |
|  |  |  | W1 and W2 in same subframe | W2_w | RI and RANK in separate subframes | RI ‖ RANK ‖ W1, W2_w ‖ CQI_w<br>RI ‖ RANK ‖ W1, W2_w, CQI_w<br>RI, W1, W2_w ‖ RANK ‖ CQI_w |
|  |  |  |  |  | RI and RANK in same subframe | RI, RANK ‖ W1, W2_w ‖ CQI_w<br>RI, RANK ‖ W1, W2_w, CQI_w<br>RI, RANK, W1, W2_w ‖ CQI_w |
|  |  | subband report (CQI and/or W2) | W1 and W2 in separate subframes | W2_w | RI and RANK in separate subframes | RI, W1 ‖ RANK ‖ W2_w, CQI_w ‖ CQI_s<br>RI ‖ RANK ‖ W1 ‖ W2_w, CQI_w ‖ CQI_s<br>RI ‖ RANK ‖ W1, CQI_w ‖ W2_w, CQI_s |
|  |  |  |  |  | RI and RANK in same subframe | RI, RANK, W1 ‖ W2_w, CQI_w ‖ CQI_s<br>RI, RANK ‖ W1 ‖ W2_w, CQI_w ‖ CQI_s<br>RI, RANK ‖ W1, CQI_w ‖ W2_w, CQI_s |
|  |  |  |  | W2_s | RI and RANK in separate subframes | RI, W1 ‖ RANK ‖ W2_w, CQI_w ‖ W2_s, CQI_s<br>RI ‖ RANK ‖ W1 ‖ W2_w, CQI_w ‖ W2_s, CQI_s<br>RI ‖ RANK ‖ W1, W2_w, CQI_w ‖ W2_s, CQI_s<br>RI ‖ RANK ‖ W1, CQI_w ‖ W2_s, CQI_s |

TABLE 5-continued

| PMI feedback Type (No PMI, PMI) | rank recommen- dation/ restriction feedback informa- tion | subband/ no subband report | W1/W2 in same or separate sub- frames | W2_s/ W2_w | RI and RANK in same or separate sub- frames | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|---|
| | | | | | RI and RANK in same sub- frame | RI, RANK, W1 \|\| W2_w, CQI_w \|\| W2_s, CQI_s <br> RI, RANK \|\| W1 \|\| W2_w, CQI_w \|\| W2_s, CQI_s <br> RI, RANK \|\| W1, W2_w, CQI_w \|\| W2_s, CQI_s <br> RI, RANK \|\| W1, CQI_w \|\| W2_s, CQI_s |
| | | | W1 and W2 in same sub- frame | W2_w | RI and RANK in separate sub- frames | RI \|\| RANK \|\| W1, W2_w \|\| CQI_w \|\| CQI_s <br> RI \|\| RANK \|\| W1, W2_w, CQI_w \|\| CQI_s <br> RI, W1, W2_w \|\| RANK \|\| CQI_w \|\| CQI_s |
| | | | | | RI and RANK in same sub- frame | RI, RANK \|\| W1, W2_w \|\| CQI_w \|\| CQI_s <br> RI, RANK \|\| W1, W2_w, CQI_w \|\| CQI_s <br> RI, RANK, W1, W2_w \|\| CQI_w \|\| CQI_s |
| | rank + differential CQI report | No subband report | W1 and W2 in separate sub- frames | W2_w | RI and RANK in separate sub- frames | RI, W1 \|\| RANK \|\| W2_w, CQI_w, CQI_wd <br> RI, W1 \|\| RANK \|\| W2_w, CQI_w \|\| CQI_wd <br> RI \|\| RANK \|\| W1 \|\| W2_w, CQI_w, CQI_wd <br> RI \|\| RANK \|\| W1 \|\| W2_w, CQI_w \|\| CQI_wd |
| | | | | | RI and RANK in same sub- frame | RI, RANK, W1 \|\| W2_w, CQI_w, CQI_wd <br> RI, RANK, W1 \|\| W2_w, CQI_w \|\| CQI_wd <br> RI, RANK \|\| W1 \|\| W2_w, CQI_w, CQI_wd <br> RI, RANK \|\| W1 \|\| W2_w, CQI_w \|\| CQI_wd |
| | | | W1 and W2 in same sub- frame | W2_w | RI and RANK in separate sub- frames | RI \|\| RANK \|\| W1, W2_w \|\| CQI_w, CQI_wd <br> RI \|\| RANK \|\| W1, W2_w \|\| CQI_w \|\| CQI_wd <br> RI \|\| RANK \|\| W1, W2_w, CQI_w, CQI_wd <br> RI \|\| RANK \|\| W1, W2_w, CQI_w \|\| CQI_wd <br> RI, W1, W2_w \|\| RANK \|\| CQI_w, CQI_wd <br> RI, W1, W2_w \|\| RANK \|\| CQI_w \|\| CQI_wd |

TABLE 5-continued

| PMI feedback Type (No PMI, PMI) | rank recommendation/ restriction/ no feedback information | W1/W2 in same or separate subband/subband report | W2_s/W2_w | RI and RANK in same or separate subframes | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|
| | | | | RI and RANK in same subframe | RI, RANK \|\| W1, W2_w \|\| CQI_w, CQI_wd<br>RI, RANK \|\| W1, W2_w \|\| CQI_w \|\| CQI_wd<br>RI, RANK \|\| W1, W2_w, CQI_w, CQI_wd<br>RI, RANK \|\| W1, W2_w, CQI_w \|\| CQI_wd<br>RI, RANK, W1, W2_w \|\| CQI_w, CQI_wd<br>RI, RANK, W1, W2_w \|\| CQI_w \|\| CQI_wd |
| | subband and report (CQI and/or W2) | W1 and W2 in separate subframes | W2_w | RI and RANK in separate subframes | RI, W1 \|\| RANK \|\| W2_w, CQI_w, CQI_wd \|\| CQI_s<br>RI, W1 \|\| RANK \|\| W2_w, CQI_w, CQI_wd \|\| CQI_s, CQI_sd<br>RI, W1 \|\| RANK \|\| W2_w, CQI_w, CQI_wd \|\| CQI_s \|\| CQI_sd<br>RI, W1 \|\| RANK \|\| W2_w, CQI_w \|\| CQI_wd \|\| CQI_s<br>RI, W1 \|\| RANK \|\| W2_w, CQI_w \|\| CQI_wd \|\| CQI_s, CQI_sd<br>RI, W1 \|\| RANK \|\| W2_w, CQI_w \|\| CQI_wd \|\| CQI_s \|\| CQI_sd<br>RI \|\| RANK \|\| W1 \|\| W2_w, CQI_w, CQI_wd \|\| CQI_s<br>RI \|\| RANK \|\| W1 \|\| W2_w, CQI_w, CQI_wd \|\| CQI_s, CQI_sd<br>RI \|\| RANK \|\| W1 \|\| W2_w, CQI_w, CQI_wd \|\| CQI_s \|\| CQI_sd<br>RI \|\| RANK \|\| W1 \|\| W2_w, CQI_w \|\| CQI_wd \|\| CQI_s<br>RI \|\| RANK \|\| W1 \|\| W2_w, CQI_w \|\| CQI_wd \|\| CQI_s, CQI_sd<br>RI \|\| RANK \|\| W1 \|\| W2_w, CQI_w \|\| CQI_wd \|\| CQI_s \|\| CQI_sd<br>RI \|\| RANK \|\| W1, CQI_w, CQI_wd \|\| W2_w, CQI_s<br>RI \|\| RANK \|\| W1, CQI_w, CQI_wd \|\| W2_w, CQI_s, CQI_sd<br>RI \|\| RANK \|\| W1, CQI_w, CQI_wd \|\| W2_w, CQI_s \|\| CQI_sd<br>RI \|\| RANK \|\| W1, CQI_w \|\| CQI_wd \|\| W2_w, CQI_s<br>RI \|\| RANK \|\| W1, CQI_w \|\| CQI_wd \|\| W2_w, CQI_s, CQI_sd<br>RI \|\| RANK \|\| W1, CQI_w \|\| CQI_wd \|\| W2_w, CQI_s \|\| CQI_sd |

TABLE 5-continued

| PMI feedback Type | rank recommendation/ restriction | W1/W2 in same or separate subband/ no subband report | | RI and RANK in same or separate sub- frames | reporting modes |
|---|---|---|---|---|---|
| (No PMI, PMI) | feedback information | subband/ no subband report | W2_s/ W2_w | same or separate sub- frames | CQI_w: wideband CQI<br>CQI_s: subband CQI<br>CQI_wd: wideband diff. CQI for RANK rec./restr.<br>CQI_sd: subband diff. CQI for RANK rec./restr. |

| | |
|---|---|
| RI and RANK in same sub- frame | RI, RANK, W1 ‖ W2_w, CQI_w, CQI_wd ‖ CQI_s<br>RI, RANK, W1 ‖ W2_w, CQI_w, CQI_wd ‖ CQI_s, CQI_sd<br>RI, RANK, W1 ‖ W2_w, CQI_w, CQI_wd ‖ CQI_s ‖ CQI_sd<br>RI, RANK, W1 ‖ W2_w, CQI_w ‖ CQI_wd ‖ CQI_s<br>RI, RANK, W1 ‖ W2_w, CQI_w ‖ CQI_wd ‖ CQI_s, CQI_sd<br>RI, RANK, W1 ‖ W2_w, CQI_w ‖ CQI_wd ‖ CQI_s ‖ CQI_sd<br>RI, RANK ‖ W1 ‖ W2_w, CQI_w, CQI_wd ‖ CQI_s<br>RI, RANK ‖ W1 ‖ W2_w, CQI_w, CQI_wd ‖ CQI_s, CQI_sd<br>RI, RANK ‖ W1 ‖ W2_w, CQI_w, CQI_wd ‖ CQI_s ‖ CQI_sd<br>RI, RANK ‖ W1 ‖ W2_w, CQI_w ‖ CQI_wd ‖ CQI_s<br>RI, RANK ‖ W1 ‖ W2_w, CQI_w ‖ CQI_wd ‖ CQI_s, CQI_sd<br>RI, RANK ‖ W1 ‖ W2_w, CQI_w ‖ CQI_wd ‖ CQI_2_s ‖ CQI_sd<br>RI, RANK ‖ W1, CQI_w, CQI_wd ‖ W2_w, CQI_s,<br>RI, RANK ‖ W1, CQI_w, CQI_wd ‖ W2_w, CQI_s, CQI_sd<br>RI, RANK ‖ W1, CQI_w, CQI_wd ‖ W2_w, CQI_s ‖ CQI_sd<br>RI, RANK ‖ W1, CQI_w ‖ CQI_wd ‖ W2_w, CQI_s,<br>RI, RANK ‖ W1, CQI_w ‖ CQI_wd ‖ W2_w, CQI_s, CQI_sd<br>RI, RANK ‖ W1, CQI_w ‖ CQI_wd ‖ W2_w, CQI_s ‖ CQI_sd |

TABLE 5-continued

| PMI feedback Type (No PMI, PMI) | rank recommendation/ restriction/ no feedback information | W1/W2 in same subband/ no subband report | | RI and RANK in same or separate subframes | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|
| | | | W2_s/ W2_w | | |
| | | | W2_s | RI and RANK in separate subframes | RI, W1 || RANK || W2_w, CQI_w, CQI_wd || W2_s, CQI_s RI, W1 || RANK || W2_w, CQI_w, CQI_wd || W2_s, CQI_s, CQI_sd RI, W1 || RANK || W2_w, CQI_w, CQI_wd || W2_s, CQI_s || CQI_sd RI, W1 || RANK || W2_w, CQI_w || CQI_wd || W2_s, CQI_s RI, W1 || RANK || W2_w, CQI_w || CQI_wd || W2_s, CQI_s, CQI_sd RI, W1 || RANK || W2_w, CQI_w || CQI_wd || W2_s, CQI_s || CQI_sd RI || RANK || W1 || W2_w, CQI_w, CQI_wd || W2_s, CQI_s RI || RANK || W1 || W2_w, CQI_w, CQI_wd || W2_s, CQI_s, CQI_sd RI || RANK || W1 || W2_w, CQI_w, CQI_wd || W2_s, CQI_s || CQI_sd RI || RANK || W1 || W2_w, CQI_w || CQI_wd || W2_s, CQI_s RI || RANK || W1 || W2_w, CQI_w || CQI_wd || W2_s, CQI_s, CQI_sd RI || RANK || W1 || W2_w, CQI_w || CQI_wd || W2_s, CQI_s || CQI_sd RI || RANK || W1, W2_w, CQI_w, CQI_wd || W2_s, CQI_s RI || RANK || W1, W2_w, CQI_w, CQI_wd || W2_s, CQI_s, CQI_sd RI || RANK || W1, W2_w, CQI_w, CQI_wd || W2_s, CQI_s || CQI_sd RI || RANK || W1, W2_w, CQI_w || CQI_wd || W2_s, CQI_s RI || RANK || W1, W2_w, CQI_w || CQI_wd || W2_s, CQI_s, CQI_sd RI || RANK || W1, W2_w, CQI_w || CQI_wd || W2_s, CQI_s || CQI_sd RI || RANK || W1, CQI_w, CQI_wd || W2_s, CQI_s RI || RANK || W1, CQI_w, CQI_wd || W2_s, CQI_s, CQI_sd RI || RANK || W1, CQI_w, CQI_wd || W2_s, CQI_s || CQI_sd RI || RANK || W1, CQI_w || CQI_wd || W2_s, CQI_s RI || RANK || W1, CQI_w || CQI_wd || W2_s, CQI_s, CQI_sd RI || RANK || W1, CQI_w || CQI_wd || W2_s, CQI_s || CQI_sd |

TABLE 5-continued

| PMI feedback Type (No PMI, PMI) | rank recommendation/ restriction/no feedback information | W1/W2 in same subband/no subband report | | RI and RANK in same or separate sub-frames | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|
| | | | W2_s/ W2_w | | |

| | | |
|---|---|---|
| | RI and RANK in same sub-frame | RI, RANK, W1 \|\| W2_w, CQI_w, CQI_wd \|\| W2_s, CQI_s |
| | | RI, RANK, W1 \|\| W2_w, CQI_w, CQI_wd \|\| W2_s, CQI_s, CQI_sd |
| | | RI, RANK, W1 \|\| W2_w, CQI_w, CQI_wd \|\| W2_s, CQI_s \|\| CQI_sd |
| | | RI, RANK, W1 \|\| W2_w, CQI_w \|\| CQI_wd \|\| W2_s, CQI_s |
| | | RI, RANK, W1 \|\| W2_w, CQI_w \|\| CQI_wd \|\| W2_s, CQI_s, CQI_sd |
| | | RI, RANK, W1 \|\| W2_w, CQI_w \|\| CQI_wd \|\| W2_s, CQI_s \|\| CQI_sd |
| | | RI, RANK \|\| W1 \|\| W2_w, CQI_w, CQI_wd \|\| W2_s, CQI_s |
| | | RI, RANK \|\| W1 \|\| W2_w, CQI_w, CQI_wd \|\| W2_s, CQI_s, CQI_sd |
| | | RI, RANK \|\| W1 \|\| W2_w, CQI_w, CQI_wd \|\| W2_s, CQI_s \|\| CQI_sd |
| | | RI, RANK \|\| W1 \|\| W2_w, CQI_w \|\| CQI_wd \|\| W2_s, CQI_s |
| | | RI, RANK \|\| W1 \|\| W2_w, CQI_w \|\| CQI_wd \|\| W2_s, CQI_s, CQI_sd |
| | | RI, RANK \|\| W1 \|\| W2_w, CQI_w \|\| CQI_wd \|\| W2_s, CQI_s \|\| CQI_sd |
| | | RI, RANK \|\| W1, W2_w, CQI_w, CQI_wd \|\| W2_s, CQI_s |
| | | RI, RANK \|\| W1, W2_w, CQI_w, CQI_wd \|\| W2_s, CQI_s, CQI_sd |
| | | RI, RANK \|\| W1, W2_w, CQI_w, CQI_wd \|\| W2_s, CQI_s \|\| CQI_sd |
| | | RI, RANK \|\| W1, W2_w, CQI_w \|\| CQI_wd \|\| W2_s, CQI_s |
| | | RI, RANK \|\| W1, W2_w, CQI_w \|\| CQI_wd \|\| W2_s, CQI_s, CQI_sd |
| | | RI, RANK \|\| W1, W2_w, CQI_w \|\| CQI_wd \|\| W2_s, CQI_s \|\| CQI_sd |
| | | RI, RANK \|\| W1, CQI_w, CQI_wd \|\| W2_s, CQI_s |
| | | RI, RANK \|\| W1, CQI_w, CQI_wd \|\| W2_s, CQI_s, CQI_sd |
| | | RI, RANK \|\| W1, CQI_w, CQI_wd \|\| W2_s, CQI_s \|\| CQI_sd |
| | | RI, RANK \|\| W1, CQI_w \|\| CQI_wd \|\| W2_s, CQI_s |
| | | RI, RANK \|\| W1, CQI_w \|\| CQI_wd \|\| W2_s, CQI_s, CQI_sd |
| | | RI, RANK \|\| W1, CQI_w \|\| CQI_wd \|\| W2_s, CQI_s \|\| CQI_sd |

TABLE 5-continued

| PMI feedback Type (No PMI, PMI) | rank recommendation/ restriction feedback information | W1/W2 in same subband/ no subband report | | RI and RANK in same or separate sub- frames | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|
| | | or separate sub- frames | W2_s/ W2_w | | |
| | | W1 and W2 in same sub- frame | W2_w | RI and RANK in separate sub- frames | RI \|\| RANK \|\| W1, W2_w \|\| CQI_w \|\| CQI_wd \|\| CQI_s \|\| RI \|\| RANK \|\| W1, W2_w \|\| CQI_w, CQI_wd \|\| CQI_s, CQI_sd RI \|\| RANK \|\| W1, W2_w \|\| CQI_w, CQI_wd \|\| CQI_s \|\| CQI_sd RI \|\| RANK \|\| W1, W2_w \|\| CQI_w \|\| CQI_wd \|\| CQI_s RI \|\| RANK \|\| W1, W2_w, CQI_w \|\| CQI_wd \|\| CQI_s, CQI_sd RI \|\| RANK \|\| W1, W2_w \|\| CQI_w \|\| CQI_wd \|\| CQI_s \|\| CQI_sd RI \|\| RANK \|\| W1, W2_w, CQI_w, CQI_wd \|\| CQI_s RI \|\| RANK \|\| W1, W2_w, CQI_w, CQI_wd \|\| CQI_s, CQI_sd RI \|\| RANK \|\| W1, W2_w, CQI_w, CQI_wd \|\| CQI_s \|\| CQI_sd RI \|\| RANK \|\| W1, W2_w, CQI_w \|\| CQI_wd \|\| CQI_s RI \|\| RANK \|\| W1, W2_w , CQI_w \|\| CQI_wd \|\| CQI_s, CQI_sd RI \|\| RANK \|\| W1, W2_w, CQI_w \|\| CQI_wd \|\| CQI_s \|\| CQI_sd RI, W1, W2_w \|\| RANK \|\| CQI_w, CQI_wd \|\| CQI_s RI, W1, W2_w \|\| RANK \|\| CQI_w, CQI_wd \|\| CQI_s, CQI_sd RI, W1, W2_w \|\| RANK \|\| CQI_w, CQI_wd \|\| CQI_s \|\| CQI_sd RI, W1, W2_w \|\| RANK \|\| CQI_w \|\| CQI_wd \|\| CQI_s RI, W1, W2_w \|\| RANK \|\| CQI_w \|\| CQI_wd \|\| CQI_s, CQI_sd RI, W1, W2_w \|\| RANK \|\| CQI_w \|\| CQI_wd \|\| CQI_s \|\| CQI_sd |

TABLE 5-continued

| PMI feedback Type (No PMI, PMI) | rank recommendation/ restriction feedback information | W1/W2 in same or separate sub- frames | | RI and RANK in same or separate sub- frames | reporting modes CQI_w: wideband CQI CQI_s: subband CQI CQI_wd: wideband diff. CQI for RANK rec./restr. CQI_sd: subband diff. CQI for RANK rec./restr. |
|---|---|---|---|---|---|
| | | subband/ no subband report | W2_s/ W2_w | | |
| | | | | RI and RANK in same sub- frame | RI, RANK \|\| W1, W2_w \|\| CQI_w, CQI_wd \|\| CQI_s<br>RI, RANK \|\| W1, W2_w \|\| CQI_w, CQI_wd \|\| CQI_s, CQI_sd<br>RI, RANK \|\| W1, W2_w \|\| CQI_w, CQI_wd \|\| CQI_s \|\| CQI_sd<br>RI, RANK \|\| W1, W2_w \|\| CQI_w \|\| CQI_wd \|\| CQI_s<br>RI, RANK \|\| W1, W2_w \|\| CQI_w \|\| CQI_wd \|\| CQI_s, CQI_sd<br>RI, RANK \|\| W1, W2_w \|\| CQI_w \|\| CQI_wd \|\| CQI_s \|\| CQI_sd<br>RI, RANK \|\|<br>W1, W2_w, CQI_w, CQI_wd \|\| CQI_s<br>RI, RANK \|\|<br>W1, W2_w, CQI_w, CQI_wd \|\|<br>CQI_s, CQI_sd<br>RI, RANK \|\|<br>W1, W2_w, CQI_w, CQI_wd \|\| CQI_s<br>\|\|CQI_sd<br>RI, RANK \|\| W1, W2_w, CQI_w \|\|<br>CQI_wd \|\| CQI_s<br>RI, RANK \|\| W1, W2_w, CQI_w \|\|<br>CQI_wd \|\| CQI_s, CQI_sd<br>RI, RANK \|\| W1, W2_w, CQI_w \|\|<br>CQI_wd \|\| CQI_s \|\| CQI_sd<br>RI, RANK, W1, W2_w \|\|<br>CQI_w, CQI_wd \|\| CQI_s<br>RI, RANK, W1, W2_w \|\|<br>CQI_w, CQI_wd \|\| CQI_s,CQI_sd<br>RI, RANK, W1, W2_w \|\|<br>CQI_w, CQI_wd \|\| CQI_s \|\| CQI_sd<br>RI, RANK, W1, W2_w \|\| CQI_w \|\|<br>CQI_wd \|\| CQI_s<br>RI, RANK, W1, W2_w \|\| CQI_w \|\|<br>CQI_wd \|\| CQI_s, CQI_sd<br>RI, RANK, W1, W2_w \|\| CQI_w \|\|<br>CQI_wd \|\| CQI_s \|\| CQI_sd |

In Table 5, the shaded section may denote relatively strong candidates.

Several cases in Table 5 will be described as follows.

<No Subband Report—W1 and W2 in Separate Sub-frames—W2_w>

Example 1

Reporting mode RI,RANK,W1||W2_w,CQI_w

The RI, the RANK, and W1 may be reported in the same subframe. The RI, the RANK, and W1 may be jointly encoded or may be separately encoded. W1 may be selected from a codebook C1 or a codebook subset of the codebook C1.

W2_w may be W2 selected, from a codebook C2 or a codebook subset of the codebook C2, with respect to a whole band. When the codebook subset of the codebook C2 includes only one codeword, W1 and W2_w may be mapped in a one-to-one mapping function. In this example, signaling may not be explicitly performed with respect to W2_w.

CQI_w may be computed by assuming that a precoder is a function with respect to reported W1 and W2_w. W2_w and CQI_w may be jointly encoded, and may be reported in the same sub-frame.

Information associated with the RI, the RANK, and W1, and information associated with CQI_w may be reported in two different frames.

Example 2

Reporting mode RI,RANK||W1||W2_w,CQI_w

The RI and the RANK may be reported in the same sub-frame. The RI and the RANK may be jointly encoded or may be separately encoded.

The R1 and W1 may be reported in different subframes. W1 may be selected from the codebook C1 or the codebook subset of the codebook C1.

W2_w may be W2 selected, from the codebook C2 or the codebook subset of the codebook C2, with respect to the whole band. When the codebook subset of the codebook C2 may include only one codework, W1 and W2_w may be mapped in a one-to-one mapping function. In this example, signaling may not be explicitly performed with respect to W2_w.

CQI_w may be computed by assuming that the precoder is a function with respect to reported W1 and W2_w. W2_w and CQI_w may be jointly encoded and may be reported in the same subframe.

Information associated with the RI and the RANK, information associated with W1, and information associated with W2_w and CQI_w may be reported in three different subframes.

<No Subband Report—W1 and W2 in the Same Subframe—W2_w>

Example

Reporting Mode RI,RANK‖W1,W2_w‖CQI_w

The RI and the RANK may be reported in the same subframe. The RI and the RANK may be jointly encoded or may be separately encoded.

The R1 and W1 may be reported in different subframes. W1 may be selected from the codebook C1 or the codebook subset of the codebook C1.

W2_w may be W2 selected, from the codebook C2 or the codebook subset of the codebook C2, with respect to the whole band. The W1 and W2_w may be jointly encoded and may be reported in the same subframe. When the codebook subset of the codebook C2 includes only one codeword, W1 and W2_w may be mapped in a one-to-one mapping function. In this example, signaling may not be explicitly performed with respect to W2_w.

CQI_w may be computed by assuming that the precoder is a function with respect to reported W1 and W2_w.

Information associated with the RI and the RANK, information associated with W1 and W2_w, and information associated with CQI_w may be reported in three different subframes.

<Subband Report (CQI and/or W2)—W1 and W2 in Separate Subframes—W2_w>

Example

Reporting mode RI, RANK, W1‖W2_w,CQI_w‖CQI_s

The RI, the RANK, and W1 may be reported in the same subframe. The RI, the RANK, and W1 may be jointly encoded or may be separately encoded. W1 may be selected from the codebook C1 or the codebook subset of the codebook C1.

W2_w may be W2 selected, from the codebook C2 or the codebook subset of the codebook C2, with respect to the whole band. When the codebook subset of the codebook C2 includes only one codeword, W1 and W2_w may be mapped in a one-to-one mapping function. In this example, signaling may not be explicitly performed with respect to W2_w.

CQI_w may be computed by assuming that the precoder is a function with respect to reported W1 and W2_w. W2_2 and CQI_w may be jointly encoded and may be reported in the same subframe.

CQI_w may denote subband CQI obtained from a single selected subband. CQI_s may be computed by assuming that the precoder is a function with respect to reported W1 and W2_w in the corresponding subband.

Information associated with the RI, the RANK, and W1, information associated with W2_w and CQI_w, and information associated with CQI_s may be reported in three different subframes.

<Subband Report (CQI and/or W2)—W1 and W2 in Separate Subframes—W2 s>

Example

Reporting Mode RI, RANK, W1‖W2_w, CQI_w‖W2_s, CQI_s

The RI, the RANK, and W1 may be reported in the same subframe. The RI, the RANK, W1 may be jointly encoded or may be separately encoded. W1 may be selected from the codebook C1 or the codebook subset of the codebook C1.

W2_w may be W2 selected, from the codebook C2 or the codebook subset of the codebook C2, with respect to the whole band. When the codebook subset of the codebook C2 includes only one codeword, W1 and W2_w may be mapped in a one-to-one mapping function. In this example, signaling may not be explicitly performed with respect to W2_w.

W2_s may be W2 selected with respect to the subband, from the codebook 2 or the codebook subset of the codebook C2.

CQI_w may be computed by assuming that the precoder is a function with respect to reported W1 and W2_w. W2_w and CQI_w may be jointly encoded and may be reported in the same subframe.

CQI_s may denote subband CQI obtained from a single selected subband. CQI_s may be computed by assuming that the precoder is a function with respect to reported W1 and W2_s. W2_s and CQI_s may be jointly encoded and may be reported in the same subframe.

Information associated with the RI, the RANK, and W1, information associated with W2_w and CQI_w, and information associated with W2_s and CQI_s may be reported in three different subframes.

<Subband Report (CQI and/or W2)—W1 and W2 in the Same Subframe—W2_w>

Example

Reporting Mode RI, RANK∥W1, W2_w∥CQI_w∥CQI_s

The RI and the RANK may be reported in the same subframe. The RI and the RANK may be jointly encoded or may be separately encoded.

The R1 and W1 may be reported in different subframes. W1 may be selected from the codebook C1 or the codebook subset of the codebook C1.

W2_w may be W2 selected with respect to the whole band, from the codebook C2 or the codebook subset of the codebook C2. W1 and W2_w may be jointly encoded and may be reported in the same subframe. When the codebook subset of the codebook C2 includes only one codeword, W1 and W2_w may be mapped in a one-to-one mapping function. In this example, signaling may not be explicitly performed with respect to W2_w.

CQI_w may be computed by assuming that the precoder is a function with respect to reported W1 and W2_w.

CQI_s may denote subband CQI obtained from a single selected subband. CQI_s may be computed by assuming that the precoder is a function with respect to reported W1 and W2_s.

Information associated with the RI, the RANK, and W1, information associated with W1 and W2_w, information associated with CQI_w, and information associated with CQI_s may be reported in four different subframes.

<More Descriptions for Reporting Modes>

Lists of potential reporting modes for a terminal that reports CoMP information associated with rank restriction and rank recommendation have been described. Several reporting modes will be described in more detail. Although descriptions with respect to all candidate reporting modes are not provided, descriptions for the several candidate reporting modes may be applicable to other candidate reporting modes.

More particularly, the following reporting modes will be described in more detail.

Reporting mode RI,RANK∥W1,W2_w,CQI_w.

Reporting mode RI,RANK∥W1,CQI_w∥W2_s,CQI_s.

First, LTE Rel-8 reporting modes will be described, and extension of LTE Rel-8 with respect to proposed candidate reporting modes will be described.

<Reporting Types>

In LTE Rel-8 and Rel-9, four CQI/PMI and RI reporting types with distinct periods and offsets for each of PUCCH reporting modes may be provided as shown in Table 6 that is based on TS 36.213.

Type 1 report supports CQI feedback with respect to selected subbands of a terminal.

Type 2 report supports wideband CQI and PMI feedback.

Type 3 report supports RI feedback.

Type 4 report supports wideband CQI.

TABLE 6

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

NA may denote 'not assigned' or 'not available'. In this example, NA may denote that a corresponding reporting mode or a corresponding reporting type is not used.

In the future, a larger number of CQI/PMI and RI reporting types with distinct periods and offsets for each of the PUCCH reporting modes will need to be supported. Accordingly, for the purpose of exemplary embodiments, Mode 2-2, as illustrated in Table 7, is taken as an example. Mode 2-2 may be expressed as RI∥W1,CQI_w∥W2_s,CQI_s. Five new feedback types are proposed. Therefore, the following feedback types are required.

Type 1 report supports CQI feedback with respect to selected subbands of a terminal.

Type 2 report supports wideband CQI and PMI feedback.

Type 3 report supports RI feedback.

Type 4 report supports wideband CQI.

Type 5 report supports CQI and PMI feedback with respect to the selected subbands of the terminal.

The type 5 report may enable the report of subband differential PMI, for example, W2, and subband CQI.

TABLE 7

| PUCCH Report Type | Reported | Mode State | Mode 1-1 (bits/BP) | Mode 2-1 (bits/BP) | Mode 1-0 (bits/BP) | Mode 2-0 (bits/BP) | Mode 2-2 (bits/BP) |
|---|---|---|---|---|---|---|---|
| 1 | Sub-band CQI | RI = 1 | NA | 4 + L | NA | 4 + L | NA |
|   |   | RI > 1 | NA | 7 + L | NA | 4 + L | NA |
| 2 | Wideband CQI/PMI | 2 TX Antennas RI = 1 | 6 | 6 | NA | NA | 6 |
|   |   | 4 TX Antennas RI = 1 | 8 | 8 | NA | NA | 8 |
|   |   | 8 TX Antennas RI = 1 | 8 | 8 | NA | NA | 8 |
|   |   | 2 TX Antennas RI > 1 | 8 | 8 | NA | NA | 8 |
|   |   | 4 TX Antennas RI > 1 | 11 | 11 | NA | NA | 11 |
|   |   | 8 TX Antennas RI > 1 | 11 | 11 | NA | NA | 11 |
| 3 | RI | 2-layer spatial multiplexing | 1 | 1 | 1 | 1 | 1 |
|   |   | 4-layer spatial multiplexing | 2 | 2 | 2 | 2 | 2 |
|   |   | 8-layer spatial multiplexing | 3 | 3 | 3 | 3 | 3 |
| 4 | Wideband CQI | RI = 1 or RI > 1 | NA | NA | 4 | 4 | NA |
| 5 | Sub-band CQI/subband PMI | 2 TX Antennas RI = 1 | NA | NA | NA | NA | NA |
|   |   | 4 TX Antennas RI = 1 | NA | NA | NA | NA | 4 + L + 2 |
|   |   | 8 TX Antennas RI = 1 | NA | NA | NA | NA | 4 + L + 2 |
|   |   | 2 TX Antennas RI = 2 | NA | NA | NA | NA | NA |
|   |   | 4 TX Antennas RI = 2 | NA | NA | NA | NA | 7 + L + 2 |
|   |   | 8 TX Antennas RI = 2 | NA | NA | NA | NA | 7 + L + 2 |
|   |   | 2 TX Antennas RI > 2 | NA | NA | NA | NA | NA |
|   |   | 4 TX Antennas RI > 2 | NA | NA | NA | NA | 7 + L |
|   |   | 8 TX Antennas RI > 2 | NA | NA | NA | NA | 7 + L |

In the reporting type 2 for wideband CQI/PMI, three lines associated with an 8Tx procedure have been added. A 4-bit per rank code book is assumed as a wideband PMI report to keep a payload size within 11 bits. An 8Tx antenna may potentially handle 8 layers and may require 3-bit feedback in the reporting type 3.

In mode 2-2, the reporting type 5 may require feedback of 4+L+2 bits when RI is equal to 1, may require feedback of 7+L+2 bits when RI is greater than 1. L is already defined in TS 36.213, and may be associated with a number of bits to be used for reporting a best subband in a bandwidth part. 4 bits may be used to report CQI of a single codeword and 7 bits may be used to report CQI of two codewords. When L is equal to 1 or 2, a maximized payload size of the reporting type 5 may be 11 bits in Mode 2-2. The 11 bits may be a largest payload size supportable in the PUCCH using Rel-8 standard.

The PUCCH report type 5 and mode 2-2 may be restricted to only 4Tx and 8Tx, and to RI equal to 1 or 2. The restriction may be caused by the fact that a Multi-User-MIMO (MU-MIMO) scheme requires relatively high feedback accuracy and that a terminal reporting RI equal to 1 or 2 has a probability of being scheduled in the MU-MIMO scheme. Generally, a terminal that reports RI greater than 2 may be scheduled in a Single User-MIMO SU-MIMO scheme. Mode 2-2 may be used so that subband PMI, with respect to RI greater than 2 does not need to be reported. A payload size to be used for transmitting the subband PMI with respect to the RI greater than 2 may be zero, as shown in Table 7.

To report RANK in reporting modes, such as RI, RANK∥W1, W2_w, CQI_w, denoted as NEW1 in Table 8, and RI, RANK∥W1, CQI_w∥W2_s, CQI_s, denoted as NEW2 in Table 8, an additional feedback type that enables the RI and the RANK to be reported in the same subframe may be required. Therefore, the additional feedback type denoted as a feedback type 6 may be used. The feedback types may be provided as follows.

Type 1 report supports CQI feedback with respect to selected subbands of a terminal.
Type 2 report supports wideband CQI and PMI feedback.
Type 3 report supports RI feedback.
Type 4 report supports wideband CQI.
Type 5 report supports CQI and PMI feedback with respect to the selected subbands of the terminal.
Type 6 report supports the RI and RANK feedback.

An example associated with reporting modes is described in more detail in Table 8.

TABLE 8

| PUCCH Report Type | Reported | Mode State | Mode 1-1 bits/BP | Mode 2-1 bits/BP | Mode 1-0 bits/BP | Mode 2-0 bits/BP | Mode 2-2 bits/BP | New 1 bits/BP | New 2 bits/BP |
|---|---|---|---|---|---|---|---|---|---|
| 1 | Sub-band CQI | RI = 1 | NA | 4 + L | NA | 4 + L | NA | NA | NA |
|   |   | RI > 1 | NA | 7 + L | NA | 4 + L | NA | NA | NA |
| 2 | Wideband CQI/PMI | 2 TX Antennas RI = 1 | 6 | 6 | NA | NA | 6 | 6 | 6 |

TABLE 8-continued

| PUCCH Report Type | Reported | Mode State | Mode 1-1 bits/ BP | Mode 2-1 bits/ BP | Mode 1-0 bits/ BP | Mode 2-0 bits/ BP | Mode 2-2 bits/ BP | New 1 bits/ BP | New 2 bits/ BP |
|---|---|---|---|---|---|---|---|---|---|
| | | 4 TX Antennas RI = 1 | 8 | 8 | NA | NA | 8 | 8 | 8 |
| | | 8 TX Antennas RI = 1 | 8 | 8 | NA | NA | 8 | 8 | 8 |
| | | 2 TX Antennas RI > 1 | 8 | 8 | NA | NA | 8 | 8 | 8 |
| | | 4 TX Antennas RI > 1 | 11 | 11 | NA | NA | 11 | 11 | 11 |
| | | 8 TX Antennas RI > 1 | 11 | 11 | NA | NA | 11 | 11 | 11 |
| 3 | RI | 2-layer spatial multiplexing | 1 | 1 | 1 | 1 | 1 | NA | NA |
| | | 4-layer spatial multiplexing | 2 | 2 | 2 | 2 | 2 | NA | NA |
| | | 8-layer spatial multiplexing | 3 | 3 | 3 | 3 | 3 | NA | NA |
| 4 | Wideband CQI | RI = 1 or RI > 1 | NA | NA | 4 | 4 | NA | NA | NA |
| 5 | Sub-band CQI/subband PMI | 2 TX Antennas RI = 1 | NA | NA | NA | NA | NA | NA | NA |
| | | 4 TX Antennas RI = 1 | NA | NA | NA | NA | 4 + L + 2 | NA | 4 + L + 2 |
| | | 8 TX Antennas RI = 1 | NA | NA | NA | NA | 4 + L + 2 | NA | 4 + L + 2 |
| | | 2 TX Antennas RI = 2 | NA | NA | NA | NA | NA | NA | NA |
| | | 4 TX Antennas RI = 2 | NA | NA | NA | NA | 7 + L + 2 | NA | 7 + L + 2 |
| | | 8 TX Antennas RI = 2 | NA | NA | NA | NA | 7 + L + 2 | NA | 7 + L + 2 |
| | | 2 TX Antennas RI > 2 | NA | NA | NA | NA | NA | NA | NA |
| | | 4 TX Antennas RI > 2 | NA | NA | NA | NA | 7 + L | NA | 7 + L |
| | | 8 TX Antennas RI > 2 | NA | NA | NA | NA | 7 + L | NA | 7 + L |

It has been described that the RI and the RANK may be jointly encoded or may be separately encoded when the RI and the RANK are reported in the same subframe. Examples of joint encoding of the RI and the RANK will be provided.

The following examples describe the joint encoding of the RI and the RANK for 4 transmission antennas and 8 transmission antennas. The joint encoding of the RI and the RANK may be applicable to general rank indicators. First, the RANK is assumed as a recommended rank with respect to a single interference cell.

TABLE 9

| | | RANK | | | | | |
|---|---|---|---|---|---|---|---|
| | | No RANK | 0 | 1 | 2 | 3 | 4 |
| RI | 1 | X | X | X | NA | NA | NA |
| | 2 | X | X | X | NA | NA | NA |
| | 3 | X | NA | NA | NA | NA | NA |
| | 4 | X | NA | NA | NA | NA | NA |

TABLE 10

|    | No RANK | \multicolumn{9}{c}{RANK} |
|----|---------|---|---|---|---|---|---|---|---|---|
|    |         | 0 | 1 | 2 | 3 | 4 | 5 | 6 | 7 | 8 |
| RI 1 | X | X | X | X | NA | NA | NA | NA | NA | NA |
| 2 | X | X | X | X | NA | NA | NA | NA | NA | NA |
| 3 | X | X | X | NA | NA | NA | NA | NA | NA | NA |
| 4 | X | NA | NA | NA | NA | NA | NA | NA | NA | NA |
| 5 | X | NA | NA | NA | NA | NA | NA | NA | NA | NA |
| 6 | X | NA | NA | NA | NA | NA | NA | NA | NA | NA |
| 7 | X | NA | NA | NA | NA | NA | NA | NA | NA | NA |
| 8 | X | NA | NA | NA | NA | NA | NA | NA | NA | NA |

TABLE 11

|    | \multicolumn{5}{c}{RANK} |
|----|---|---|---|---|---|
|    | 0 | 1 | 2 | 3 | 4 |
| RI 1 | X | X | NA | NA | NA |
| 2 | X | X | NA | NA | NA |
| 3 | NA | NA | NA | NA | NA |
| 4 | NA | NA | NA | NA | NA |

TABLE 12

|    | \multicolumn{9}{c}{RANK} |
|----|---|---|---|---|---|---|---|---|---|
|    | 0 | 1 | 2 | 3 | 4 | 5 | 6 | 7 | 8 |
| RI 1 | X | X | X | NA | NA | NA | NA | NA | NA |
| 2 | X | X | X | NA | NA | NA | NA | NA | NA |
| 3 | X | X | NA | NA | NA | NA | NA | NA | NA |
| 4 | NA | NA | NA | NA | NA | NA | NA | NA | NA |
| 5 | NA | NA | NA | NA | NA | NA | NA | NA | NA |
| 6 | NA | NA | NA | NA | NA | NA | NA | NA | NA |
| 7 | NA | NA | NA | NA | NA | NA | NA | NA | NA |
| 8 | NA | NA | NA | NA | NA | NA | NA | NA | NA |

Table 9 shows an example of the joint encoding of the RI and the RANK for the 4 transmission antennas, and Table 10 shows an example of the joint encoding of the RI and the RANK for the 8 transmission antennas.

In Table 9 and Table 10, X may indicate that a combination of the RI and the RANK is possible, and NA may indicate that the combination of the RI and the RANK is not supportable.

In Table 9, the RANK may have six different values, for example, No RANK, 0, 1, 2, 3, and 4. No RANK may indicate that the terminal does not report information associated with a recommended rank and restricted rank of the interference cell. Therefore, a combination of the RI and No RANK may be equal to RI in Rel 8. An RANK equal to 0 may indicate recommendation of performing silencing in the interference cell. In this example, an RANK equal to 0 or 1 may be potentially reported. A higher RANK value may not be reported since a probability that terminals select an RANK greater than or equal to 2 is low. The RANK equal to 0 or 1 may only be reported when RI is equal to 1 or 2, since generally CoMP terminals may not have large RI, such as 3 or 4, even with help of rank recommendation and rank restriction. 8 combinations may be possible since there are 8 Xs. Accordingly, feedback of 3 bits may be required. Reporting of joint information associated with the RI and the RANK using 3 bits may be more effective than reporting only the RI using 2 bits as in Rel-8.

In the same manner, 16 combinations are possible in Table 10 and thus, 4 bits may be required to perform feeding back of the joint information of RI and RANK.

The terminal may or may not report the RANK. The terminal may not report the RANK based on the RI, or may report an RANK equal to 0, 1, or 2. An eNB may require the terminal to report the RANK. In this example, No RANK may be excluded. Table 9 and Table 10 may be replaced with Table 11 and Table 12. In Table 11 and Table 12, report of the RI and the RANK may use 2 bits for the 4 transmission antennas and may use 3 bits for the 8 transmission antennas.

When the terminal reports two different recommended RANKs with respect to two different cells, RANK={RANK1, RANK2}. In this example, RANK 1 may be a recommend rank and restricted rank for a cell 1, and RANK 2 may be a recommended rank and restricted rank for a cell 2. The RI, RANK 1 and RANK 2 may be jointly encoded in a similar manner to that in Table 9 and Table 10.

When the RANK with respect to two cells are restricted to be the same, even through the terminal reports the RANK with respect to two cells, RANK=RANK1=RANK2 and thus, the RANK may be a single value. In this example, Table 9 and Table 10 may be applicable.

The joint encoding of the RI and the RANK has been described. Several reporting modes may request the RI, the RANK, and W1 to be reported in the same subframe. In this example, joint encoding of the RI, the RANK, and W1 may be useful. Exemplary embodiments may provide a three-dimensional (3D) table, such as Table 13 that is obtained by expending Table 9 or Table 10 to account for a dimension of W1. In Table 13, W1 may be classified into two types, that is A and B. Referring to Table 13, 4 bits may be used to perform the joint encoding of the RI, the RANK, and W1. Accordingly, 16 combinations may be possible with respect to three variables, as expressed by X.

TABLE 13

| | | RANK | | | | | |
|---|---|---|---|---|---|---|---|
| | | No RANK | 0 | 1 | 2 | 3 | 4 |
| W1 = A | | | | | | | |
| RI | 1 | X | X | X | X | NA | NA |
| | 2 | X | X | X | X | NA | NA |
| | 3 | X | NA | NA | NA | NA | NA |
| | 4 | X | NA | NA | NA | NA | NA |
| W1 = B | | | | | | | |
| RI | 1 | X | X | X | NA | NA | NA |
| | 2 | X | NA | NA | NA | NA | NA |
| | 3 | X | NA | NA | NA | NA | NA |
| | 4 | X | NA | NA | NA | NA | NA |

Codebook subset restriction of Rel-8 may be applicable when rank restriction and rank recommendation with respect to interference cells are performed. eNBs may restrict a set of precoders and RI that the terminals may evaluate and report, which is referred to as codebook subset restriction in Rel-8. In a case of open-loop spatial multiplexing scheme, the codebook subset restriction may be a restriction with respect to a rank reported by the terminal. Therefore, when proposed rank restriction and rank recommendation are used along with the codebook subset restrcition, terminals from eNBs may select an RANK that maximizes wideband CQI by assuming that the RI is equal to a rank based on the codebook subset restriction, instead of performing joint selection of the RI and the RANK. Similarly, the codebook subset restriction may be used to jointly restrict a joint set of the RI and the RANK that may be reported. The codebook subset restriction may restrict a subset of the RANK.

<Description of Reporting Modes NEW 1(RI, RANK||W1, W2_w, CQI_w) and NEW 2(RI, RANK||W1, CQI_w||W2_s, CQI_s)>

1. Mode New 1 of Wideband Feedback
   1) Subframe where RI and RANK are reported.
      A terminal determines the RI and the RANK assuming transmission in set S subbands.
      A terminal reports a type 6 report comprised of a single RI and a single RANK.
   2) Subframe where CQI and PMI are reported.
      A single precoding matrix is selected from the code book C1 or the codebook subset of the codebook C1 based on an assumption of transmission in set S subbands. The selection of the precoding matrix from the codebook C1 may assume that W2 is previously defined when the selection of a matrix from the codebook C1 is performed. In this example, W2 may not be reported. Also, another matrix may be selected from the codebook 2 or the subset of the codebook C2 based on an assumption of transmission in set S subbands, that is, wideband transmission. In this example, W2 may be reported along with W1.
   A terminal may report a type 2 report on each successive reporting opportunity consisting of:
      i) A single wideband CQI value that is computed based on an assumption of use of a single precoding matrix in all subbands and transmission in the set S subbands.
      ii) Selected single PMI (wideband PMI)
      iii) When RI>1, 3-bit wideband spatial differential CQI (shown in Table 7.2-2 of TS 36.213).
      In Rel-10 transmission mode and transmission mode 8, PMI and CQI may be determined based on last reported periodic RI and RANK.

2. Mode New 2 of Selected Subband Feedback of Terminal
   1) subframe where RI/RANK is reported.
      A terminal determines the RI and the RANK assuming transmission of set S subbands. The set S subbands are defined in TS 36.213.
      A terminal reports a type 6 report comprised of a single RI.
   2) subframe where wideband CQI/PMI is reported.
      A single precoding matrix W1 is selected from the codebook C1 based on an assumption of transmission in set S subbands.
      A terminal may report the type 2 report on each successive reporting opportunity consisting of:
         i) A wideband CQI value (for codeword 0) that is computed based on an assumption of use of a single precoding matrix in all subbands and transmission in the set S subbands.
         ii) Selected single Precoding Matrix W1 Indicator (wideband PMI).
         iii) When RI>1, additional 3-bit wideband spatial differential CQI (for codeword 1) [wideband codeword 1 offset level=wideband CQI index with respect to codeword 0—wideband CQI index with respect to codeword 1] (shown in Table 7.2-2 of TS 36.213).
         In Rel-10 transmission mode and transmission mode 8, PMI and CQI may be computed based on last reported periodic RI and RANK. In other transmission modes, the PMI and the CQI may be computed based on a transmission rank 1.
   3) Subframe where CQI/PMI with respect to selected subbands is reported.
      A terminal selects a preferred subband within a set of Nj subbands in each of J bandwidth parts. J may be given in Table 7.2.2-2 in TS 36.213.
      A single matrix W2 is selected from the codebook subset, of the codebook C2, based on an assumption of transmission in only the selected subband of a bandwidth part determined in a previous process, the assumption is based on a precoder W that is a function of selected W1 and W2.
      A terminal may report a type 5 report on each successive reporting opportunity consisting of:
         i) A CQI value for a codeword 0 that reflects transmission in a selected subband of a bandwidth part determined based on a corresponding preferred subband L-bit label in a previous process. The L-bit label may be defined in TS 36.213.
         ii) A selected single matrix W2 indicator (subband PMI).
         iii) When R>1, an additional 3-bit subband spatial differential CQI value with respect to a codeword 1 offset level. [codeword 1 offset level=subband CQI index with respect to codeword 0—subband CQI index with respect to codeword 1].
      In this example, it is assumed that the precoder W obtained as a function of a most recently reported single precoding matrix W1 and a selected signal matrix W2 in a selected subband of a bandwidth part determined in a previous process are used.
         iv) Mapping from a 3-bit subband spatial differential CQI value to an offset level is shown in Table 7.2-2 of TS 36.213.
         In Rel-10 transmission mode and transmission mode 8, subband selection and the CQI value may be computed based on the precoder W that is based on the last reported periodic wideband PMI W1, selected subband matrix W2 indicator, and the RI and the RANK.

Reporting Instant of RI and RANK

To operate reporting modes at correct time intervals, TS 36.213 defines the reporting time intervals. When the RI and the RANK are reported in different subframes, the RI and the RANK may have the same periodicity or the RI and the RANK may have different periodicities. When the RI and the RANK are reported together in the same subframe through joint encoding or separate encoding, the RI and the RANK may have the same periodicity.

Higher Layer Signaling

Potential messages that need to be shared at a higher layer may be arranged as described below, referring to FIG. 3

A cluster may be determined before scheduling is performed. A synchronization between a master eNB and a slave eNB, and a synchronization between a changed master eNB and a changed slave eNB may be performed among eNBs.

A terminal may periodically or aperiodically report RANK information and several pieces of optional differential CQI to a corresponding eNB.

An RANK reported by the terminal to a serving eNB may be shared by eNBs in the cluster. An eNB A may collect all recommended and restricted RANK information associated with the eNB A.

R used by the master eNB may be shared by the eNBs in the cluster. S1 and S2 may obtain information associated with the transmission rank R of the master eNB, such as [R1, R2, R1, R2, R3]. When the transmission rank R is 0, that is, in a case of silencing, additional information, such as an RNTP message, may be transmitted to eNBs to provide information associated with a resource where the silencing is performed. A frequency for sharing R may be determined.

A 1-bit indicator may be used to inform the S1 and S2 of whether scheduling of the master eNB M is CASE 1 or CASE 2.

A higher layer signaling may be requested to indicate a case that a terminal needs to compute RI based on a scheme different from a basic scheme. This may be used when a joint selection of the RI and the RANK is performed.

New procedures and messages to be used for performing rank recommendation and restriction are provided. Information to be shared between eNBs may be as follows.

1. Rank Request Indication Message

An RANK reported by a given terminal to a corresponding serving cell may be shared among eNBs. A given eNB may collect all RANK requests with respect to the corresponding eNB to compute a transmission rank priority [R1, R2, R3, . . . ]. A predetermined eNB may need only information associated with a total number of requests for each RANK value.

Example

A Cluster Comprised of eNB1, eNB2, and eNB3

The eNB1 may have three terminals requesting an RANK equal to 1 from the eNB2, and one terminal requesting an RANK equal to 2 from the eNB2, and two terminals requesting the RANK equal to 1 from the eNB3.

The eNB3 may have two terminals requesting the RANK equal to 1 from the eNB2, one terminal requesting an RANK equal to 0 from the eNB2, and two terminals requesting an RANK equal to 2 from the eNB2.

The eNB2 may have one terminal requesting the RANK equal to 1 from the eNB1, and one terminal requesting the RANK equal to 1 from the eNB3.

Based on the above information, the eNB1 may compute that one terminal requests the RANK equal to 1, and the eNB2 may compute that five terminals request the RANK equal to 1, one terminal requests the RANK equal to 0, and two terminals request the RANK equal to 2. The eNB3 may compute that three terminals request the RANK equal to 1.

Table 14 shows the number of requests for each RANK value. A terminal may report only the RANK equal to 0, 1, 2, 3, or to 4. A number of requests per RANK value may be expressed as [#RANK=0, #RANK=1, #RANK=2, #RANK=3, #RANK=4]. In this example, #RANK=0 may denote the number of requests of which an RANK is 0.

TABLE 14

| Sending eNB | Target eNB | | |
| --- | --- | --- | --- |
| | eNB1 | eNB2 | eNB3 |
| eNB1 | NA | [0, 3, 1, 0, 0] | [0, 2, 0, 0, 0] |
| eNB2 | [0, 1, 0, 0, 0] | NA | [0, 1, 0, 0, 0] |
| eNB3 | No request | [1, 2, 1, 0, 0] | NA |
| summation | [0, 1, 0, 0, 0] | [1, 5, 2, 0, 0] | [0, 3, 0, 0, 0] |
| priority | R1 = 2 | R1 = 2, R2 = 2, R3 = 0 | R1 = 1 |

In many scenarios, a time section having the RANK equal to 1 may be most frequently reported. This may show that the terminal may not report the RANK and may compute RI by assuming that the RANK is 1. An eNB may use information indicating that the RANK equal to 1 is an RANK preferred by all CoMP terminals. The eNB may compute a table similar to Table 14 by assuming all CoMP terminals prefer the RANK equal to 1, although the RANK is not actually reported. When the eNB1 has four CoMP terminals of which an aggressor is the eNB2 and has two CoMP terminals of which an aggressor is the eNB3, the eNB may assume that the RANK equal to 1 of the terminals is preferred. The same situation may happen for the eNB2 and the eNB3. When it is assumed that all eNBs are aware of a number of CoMP terminals in corresponding cells and aggressor cells of the terminals corresponding to the eNBs, Table 14 may compute a table as shown in Table 15.

TABLE 15

| Sending eNB | Target eNB | | |
| --- | --- | --- | --- |
| | eNB1 | eNB2 | eNB3 |
| eNB1 | NA | [0, 4, 0, 0, 0] | [0, 2, 0, 0, 0] |
| eNB2 | [0, 1, 0, 0, 0] | NA | [0, 1, 0, 0, 0] |
| eNB3 | No request | [0, 4, 0, 0, 0] | NA |
| summation | [0, 1, 0, 0, 0] | [0, 8, 0, 0, 0] | [0, 3, 0, 0, 0] |
| priority | R1 = 2 | R1 = 8 | R1 = 1 |

This approach may express information that the given eNB shares with another eNB, as a vector indicating a number of requests per RANK value. The vector may express RANK values corresponding to a, b, c, d, and e as [#RANK=a, #RANK=b, #RANK=c, #RANK=d, #RANK=e], respectively. In this example, #RANK=a may denote a number of requests of which an RANK is a. When it is assumed that the RANK is 1, it is sufficient to share #RANK=1 although the RANK is not actually reported.

Therefore, exemplary embodiments may provide a new message that is referred to as rank request indication. The rank request indication may indicate a number of rank recommendation and restriction requests for each RANK with respect to an eNB that receives the rank request indication. The eNB that receives the rank request indication may perform scheduling of terminals with R equal to the recommended and restricted RANK. A target cell ID included in the rank request indication may indicate a cell that is indicated by the corresponding rank request indication. The eNB that receives the rank request indication may maintain the rank request indication message to be valid until a new rank request indication is received.

The rank request indication message may carry the number of requests per RANK value. The number of requests may be expressed through various schemes, such as a bit map, an integer number, an enumerating scheme, a bit string scheme, and the like.

Transmission Rank Indication Message

Values of R used by a master eNB may need to be shared by eNBs in a cluster. S1 and S2 may obtain information such as R_eNB1=[R1, R2, R1, R2, R3]. The information may denote successive transmission ranks to be used in the eNB1 with a first priority. A frequency resource to share the values of R may be predetermined.

To transmit the information associated with a transmission rank to another eNB, exemplary embodiments may provide a new message that is referred to as transmission rank indication. The transmission rank indication may be a transmission rank that is used, with a first priority, in a cell that broadcasts a transmission rank indication message based on a unit time, such as a subframe and the like. The eNB that receives the transmission rank indication may use the transmission rank indication information to perform scheduling, such as master-slave scheduling, that schedules a CoMP terminal of which a recommended RANK is equal to the transmission rank. The eNB that receives the transmission rank indication may maintain a transmission rank indication value to be valid until a new transmission rank indication is received.

Unlike the rank request indication, the transmission rank indication may not include the target cell ID. The target cell ID may be added to the transmission rank indication, to indicate that the transmission rank indication is associated with other eNBs in the cluster. However, the adding of the target cell ID is not mandatory for operations of a scheduler.

The transmission rank indication message may provide information associated with a prioritized transmission rank based on a unit time, for example, a subframe. For example, when it is assumed that five subframes are used, the transmission rank indication message may provide information associated with transmission ranks for five subframes. Transmission ranks may be cycled after five subframes. For example, when ti=mod(t,5) and mod is a modulo operation, Rti may denote a transmission rank at a time t. When R1, R2, and R3 are different transmission ranks, [Rt1, Rt2, Rt3, Rt4, Rt5]= [R1, R2, R1, R2, R3].

The transmission ranks may be expressed through various schemes, such as a bit map, an integer number, an enumerating scheme, a bit string scheme, and the like. When five unit times are cycled and transmission ranks 0, 1, 2, 3, and 4 are used, the transmission rank indication message may indicate a prioritized transmission rank for each time instant.

Another method to indicate the same information may list possible transmission ranks and may indicate a time instant to be used for a corresponding transmission rank.

When the transmission rank R is equal to 0, that is, in a case of silencing, additional information, such as, an RNTP message, may be shared among eNBs to inform about a resource where the silencing is performed. In this example, messages, such as the RNTP message, to be used for the case where the transmission rank R equal to 0 is used, may be reported in several subframes.

Empty Set Indication Message 1-bit information may be used to inform slave terminals, that is, 51 and S2, of whether scheduling of the master eNB M is CASE 1 or CASE 2.

To provide the information to other eNBs, more particularly, to slave eNBs, exemplary embodiments may provide a new message that is referred to as an empty set indication message.

Empty set indication may indicate that a transmission rank to be used, with a first priority, by an eNB that broadcasts the empty set indication is not used in the eNB, since a set of terminals that reports RI equal to the transmission rank is empty. An eNB that receives the empty set indication message may use empty set indication information to determine whether to perform scheduling, without any restriction from a coordinated scheduler. The eNB that receives the empty set indication message may maintain an empty set indication value to be valid during a period where a predetermined transmission rank is to be used with a first priority.

The empty set indication message may require a faster backhaul than the two previously described messages.

Unlike the rank request indication, the empty set indication may not include the target cell ID. The target cell ID may be added the empty set indication, to indicate that the empty set indication is associated with other eNBs in the cluster. However, the adding of the target cell ID is not mandatory for operations of a scheduler.

When signaling may not be explicitly performed with respect to the empty set indication, the scheduling of the master eNB may be assumed as CASE 1.

The three messages provided in an example embodiment may require an acknowledge (ACK) from a reception node, to determine whether a corresponding message is correctly received and operated.

Figure 7:
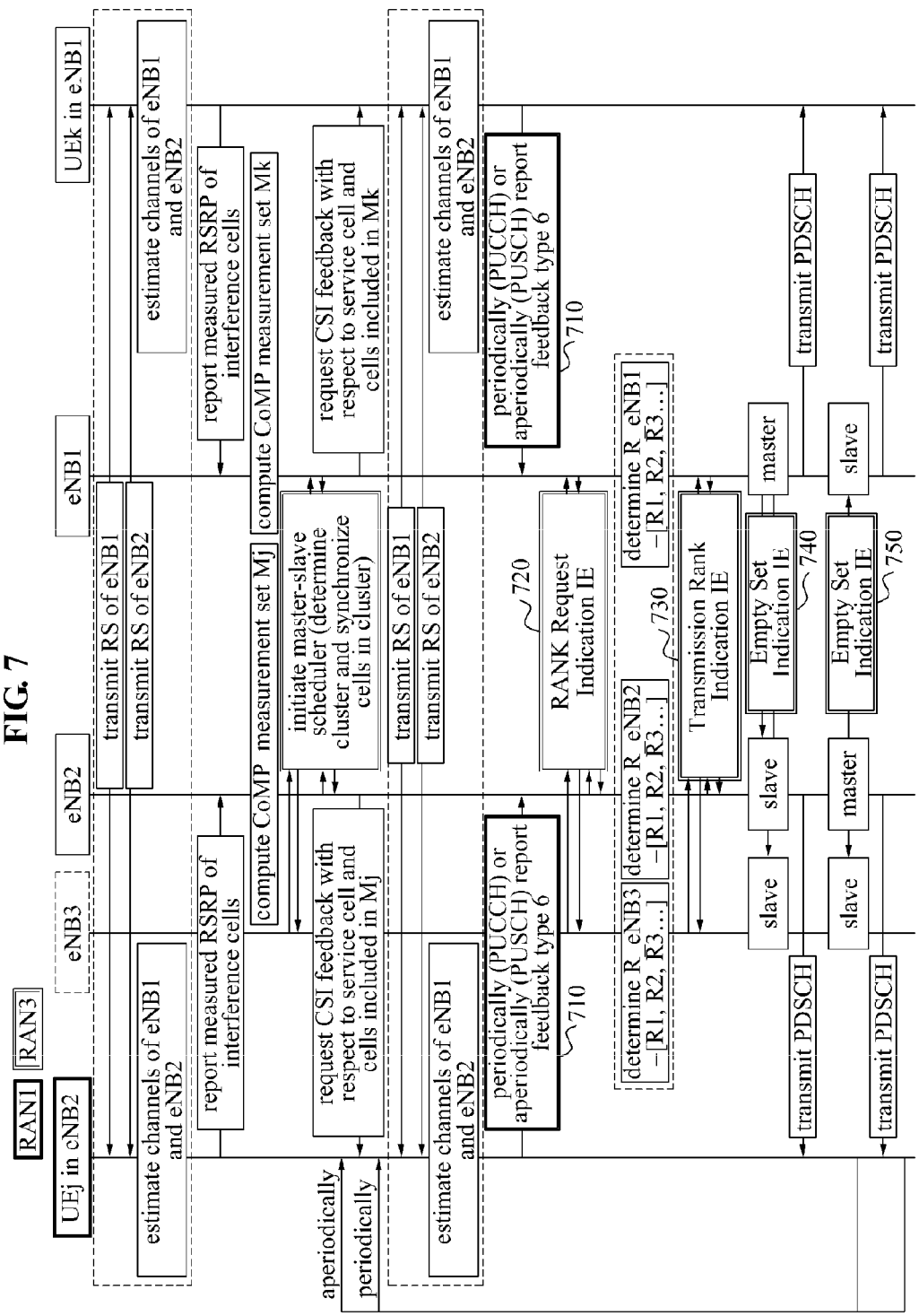
FIG. 7 is a flowchart of scheduling that is based on new messages to be used for performing rank recommendation and rank restriction according to an exemplary embodiment of the present invention.

An exemplary scheduling method using the provided three messages is illustrated in FIG. 7.

FIG. 7 illustrates scheduling that is based on new messages to be used for performing rank recommendation and rank restriction according to an exemplary embodiment of the present invention.

Referring to FIG. 7, the scheduling method may be similar to the scheduling method of FIG. 3, but may have differences in several parts. Where the methods are similar, a description will not be provided for conciseness. An RANK may be reported using a PUCCH in step 710, as opposed to using the feedback type 6.

RANK request indication may be performed in step 720, instead of sharing RANK information among eNBs. Transmission rank indication may be performed in step 730 instead of sharing a transmission rank. Empty set indication may be performed in step 740 and 750 instead of transmitting of CASE 1 and CASE 2 messages.

Exemplary embodiments have described i) a CQI computation method, ii) a scheduling method based on rank recommendation and rank restriction, iii) an uplink control signaling method, and iv) a higher layer signaling method. The methods have been described through various exemplary embodiments with reference to FIGS. 1 through 7 and thus, detailed descriptions thereof will be omitted.

The methods according to the above-described exemplary embodiments may be recorded in non-transitory computer-readable media including program instructions to implement various steps embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as Read-Only Memory (ROM), Random Access Memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. In addition, a non-transitory computer-readable storage medium may be distributed among computer systems connected through a network and non-transitory computer-readable codes or program instructions may be stored and executed in a decentralized manner.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method of a master base station in a cluster including the master base station and at least one slave base station, the method comprising:
   receiving, from at least one master terminal corresponding to the master base station, information associated with a preferred rank;
   determining a transmission rank based on information that is associated with a coordinated rank with respect to the master base station and on information that is received from at least one slave terminal corresponding to the at least one slave base station;
   scheduling, when a master terminal exists in a first master group, the master terminal included in the first master group, and scheduling, when a terminal included in the first master group is nonexistent, a master terminal included in a second master group, the first master group being defined as a set of master terminals, each of which has a preferred rank equal to the transmission rank and the second master group being defined as a set of master terminals, each of which has a preferred rank unequal to the transmission rank; and
   transmitting, to the at least one slave base station, information associated with the group in which the scheduled master terminal is included and information associated with the transmission rank.

2. The method of claim 1, wherein the determining comprises:
   receiving, from the at least one slave base station, the information associated with the coordinated rank with respect to the master base station.

3. The method of claim 1, wherein the scheduling comprises:
   performing scheduling based on a Proportional Fair (PF) scheduling in a frequency domain.

4. A communication method of a slave base station in a cluster including a master base station and at least one slave terminal, the method comprising:
   receiving information associated with a group of master terminals scheduled by the master base station and information associated with a transmission rank of the master base station; and
   adaptively scheduling the at least one slave terminal based on whether a coordinated rank of a slave terminal with respect to the master base station is equal to the transmission rank of the master base station and based on the group of the master terminals scheduled by the master base station.

5. The method of claim 4, wherein, when the group of the master terminals scheduled by the master base station comprises a first master group which is defined as a set of master terminals, each of which has a preferred rank equal to the transmission rank of the master base station, the adaptive scheduling comprises:
   scheduling, with a first priority, a slave terminal that performs coordination with the master base station and that has a coordinated rank equal to the transmission rank of the master base station when the coordinated rank is a recommended rank with respect to the master base station, and scheduling, with the first priority, a slave terminal that performs coordination with the master base station and that has a coordinated rank unequal to the transmission rank of the master base station when the coordinated rank is a restricted rank with respect to the master base station.

6. The method of claim 4, wherein, when the group of the master terminals scheduled by the master base station comprises a first master group which is defined as a set of master terminals, each of which has a preferred rank equal to the transmission rank of the master base station, and the coordinated rank comprises a recommended rank with respect to the master base station, the adaptive scheduling comprises:
   scheduling a slave terminal that does not perform coordination when a slave terminal that performs coordination with the master base station and that has a coordinated rank equal to the transmission rank of the master base station is nonexistent.

7. The method of claim 4, wherein, when the group of the master terminals scheduled by the master base station comprises a first master group which is defined as a set of master terminals, each of which has a preferred rank equal to the transmission rank of the master base station, and the coordinated rank comprises a recommended rank with respect to the master base station, the adaptive scheduling comprises:
   scheduling a slave terminal that performs coordination with the master base station and has a coordinated rank unequal to the transmission rank of the master base station or a slave terminal that performs coordination with a base station different from the master base station, when a slave terminal that performs coordination with the master base station and that has a coordinated rank equal to the transmission rank of the master base station and a slave terminal that does not perform coordination are nonexistent.

8. The method of claim 4, wherein, when the group of the master terminals scheduled by the master base station comprises a second master group which is defined as a set of master terminals, each of which has a preferred rank unequal to the transmission rank of the master base station, the adaptive scheduling comprises:
   scheduling the at least one slave terminal with the same priority.

9. A communication method of a target slave base station in a super cluster that includes a target cluster and at least one neighbor cluster, wherein the target slave base station is included in the target cluster, the target cluster includes a target master base station and at least one target slave base station, and a neighbor cluster includes a neighbor master base station and at least one neighbor slave base station, the method comprising;
   receiving information associated with a transmission rank of each of the master base station and the at least one neighbor master base station; and
   scheduling at least one target slave terminal corresponding to a target slave base station based on whether a coordinated rank is equal to a transmission rank of a corresponding coordination master base station.

10. The method of claim 9, wherein the scheduling comprises:

scheduling, with a first priority, a target slave terminal having a coordinated rank equal to a transmission rank of a corresponding coordination master base station when the coordinated rank is a recommended rank with respect to the corresponding coordination master base station, and scheduling, with a first priority, a target slave terminal having a coordinated rank unequal to a transmission rank of a corresponding master base station when the coordinated rank is a restricted rank with respect to the master base station.

11. The method of claim 9, wherein the scheduling comprises:

scheduling a target slave terminal that does not perform coordination when a target slave terminal having a coordinated rank that is a recommended rank with respect to a corresponding coordination master base station and that is equal to a transmission rank of the corresponding coordination master base station is nonexistent.

12. The method of claim 9, wherein the scheduling comprises:

scheduling a target slave terminal that has a coordinated rank unequal to a transmission rank of a corresponding coordination master base station or a target slave terminal that performs coordination with a base station different from the master base station, when a target slave terminal having a coordinated rank that is a recommend rank with respect to a corresponding coordination master base station and that is equal to a transmission rank of the corresponding coordinated master base station, and a target slave that does not perform coordination are nonexistent.

13. A non-transitory computer readable recording medium storing a program to implement the method of claim 1.

14. A non-transitory computer readable recording medium storing a program to implement the method of claim 4.

15. A non-transitory computer readable recording medium storing a program to implement the method of claim 9.

* * * * *